(12) United States Patent
Moon et al.

(10) Patent No.: US 11,824,626 B2
(45) Date of Patent: Nov. 21, 2023

(54) METHOD FOR SEPARATING PHYSICAL LAYER FUNCTIONS IN WIRELESS COMMUNICATION SYSTEM

(71) Applicant: Samsung Electronics Co., Ltd., Suwon-si (KR)

(72) Inventors: Jicheol Moon, Suwon-si (KR); Ojin Kwon, Suwon-si (KR); Namryul Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/890,501

(22) Filed: Aug. 18, 2022

(65) Prior Publication Data

US 2022/0407593 A1 Dec. 22, 2022

Related U.S. Application Data

(63) Continuation of application No. 16/960,179, filed as application No. PCT/KR2019/000224 on Jan. 7, 2019, now Pat. No. 11,456,833.

(Continued)

(51) Int. Cl.
*H04B 7/26* (2006.01)
*H04L 1/1829* (2023.01)
(Continued)

(52) U.S. Cl.
CPC ......... *H04B 7/2603* (2013.01); *H04L 1/1861* (2013.01); *H04L 5/0048* (2013.01);
(Continued)

(58) Field of Classification Search
CPC ... H04B 7/2603; H04L 1/1861; H04L 5/0048; H04L 27/2607; H04L 27/2628; H04W 72/21; H04W 72/23; H04W 74/0833
(Continued)

(56) References Cited

U.S. PATENT DOCUMENTS 8,693,572 B2 4/2014 Jo et al.
2011/0182255 A1 7/2011 Kim et al.
(Continued)

FOREIGN PATENT DOCUMENTS

CN 102742227 A 10/2012
CN 105491682 A 4/2016
(Continued)

OTHER PUBLICATIONS (TTAS), '5G Open Fronthaul Interface', Telecommunications Technology Association (TTA), TTAK.KO-06.0461, Dec. 13, 2017.
(Continued)

*Primary Examiner* — Rownak Islam
(74) *Attorney, Agent, or Firm* — Jefferson IP Law, LLP

(57) ABSTRACT

The present disclosure relates to a communication method and a system thereof that fuses a 5G communication system, for supporting data transmission rates higher than 4G systems, with IoT technology. The present disclosure can be applied to intelligent services (e.g. smart homes, smart buildings, smart cities, smart cars or connected cars, health care, digital education, retail, or security and safety related services), on the basis of 5G communication technology and IoT related technology. The present disclosure relates to a method and a device for separating physical layer functions of a base station.

20 Claims, 25 Drawing Sheets

Related U.S. Application Data

(60) Provisional application No. 62/614,711, filed on Jan. 8, 2018.

(51) Int. Cl.
  *H04L 5/00* (2006.01)
  *H04L 27/26* (2006.01)
  *H04W 74/08* (2009.01)
  *H04W 72/21* (2023.01)
  *H04W 72/23* (2023.01)

(52) U.S. Cl.
  CPC ...... *H04L 27/2607* (2013.01); *H04L 27/2628* (2013.01); *H04W 72/21* (2023.01); *H04W 72/23* (2023.01); *H04W 74/0833* (2013.01)

(58) Field of Classification Search
  USPC ........................................... 370/329
  See application file for complete search history.

(56) References Cited

U.S. PATENT DOCUMENTS

| | | |
|---|---|---|
| 2016/0100449 A1 | 4/2016 | Jang et al. |
| 2016/0234819 A1 | 8/2016 | Da Silva et al. |
| 2016/0242080 A1 | 8/2016 | Vikberg et al. |
| 2016/0242147 A1 | 8/2016 | Tarlazzi et al. |
| 2017/0099658 A1 | 4/2017 | Shattil |
| 2017/0161222 A1 | 6/2017 | Dubal et al. |
| 2017/0215173 A1 | 7/2017 | Zhu et al. |
| 2017/0332354 A1 | 11/2017 | Chang |
| 2018/0013581 A1* | 1/2018 | Fertonani ............ H04L 12/4604 |
| 2018/0063847 A1 | 3/2018 | Huang et al. |
| 2018/0075106 A1 | 3/2018 | Haver et al. |
| 2018/0138957 A1 | 5/2018 | Wang et al. |
| 2018/0191873 A1* | 7/2018 | Bao .................... H04L 61/5014 |
| 2019/0116524 A1 | 4/2019 | Isogawa et al. |
| 2019/0327656 A1 | 10/2019 | Han et al. |
| 2020/0235788 A1 | 7/2020 | Rajagopal et al. |

FOREIGN PATENT DOCUMENTS

| | | |
|---|---|---|
| CN | 106031237 A | 10/2016 |
| CN | 107113862 A | 8/2017 |
| CN | 107426776 A | 12/2017 |
| EP | 3 050 397 | 8/2016 |
| KR | 10-2013-0074239 A | 7/2013 |
| WO | 2017/107016 A1 | 6/2017 |
| WO | 2017/196126 A1 | 11/2017 |

OTHER PUBLICATIONS

3GPP TR 38.801 V14.0.0, '3GPP; Technical Specification Group Radio Access Network; Study on New Radio Access Technology; Radio Access Architecture and Interfaces (Release 14)', Apr. 3, 2017, Valbonne—France.

Donsung Oh et al., 'Fronthaul Technology Trends for 5G Mobile Communications', ETRI, 2017 Electronics and Telecommunications Trends, vol. 32, No. 5, Oct. 1, 2017.

xRAN Forum, Fronthaul Working Group White Paper, Oct. 2017.

Extended European Search Report dated Nov. 6, 2020, issued in European Patent Application No. 19736191.8.

Indian Office Action dated Jun. 3, 2022, issued in a counterpart Indian Application No. 202017028867.

SK Telecom, Deutsche Telekom, T-Mobile USA, Altiostar Networks, Considerations on function split for 5G deployment, R3-171971, May 19, 2017.

Chinese Office Action dated Dec. 27, 2022, issued in Chinese Patent Application No. 201980007655.2.

3GPP, 3rd Generation Partnership Project; Technical Specification Group Radio Access Network; NR; Physical channels and modulation (Release 15), 3GPP TS 38.211 V1.1.3 (Nov. 2017), Dec. 13, 2017.

Korean Office Action dated Aug. 5, 2023, issued in Korean Patent Application No. 10-2020-7022215.

* cited by examiner

METHOD FOR SEPARATING PHYSICAL LAYER FUNCTIONS IN WIRELESS COMMUNICATION SYSTEM

CROSS-REFERENCE TO RELATED APPLICATION(S)

This application is a continuation application of prior application Ser. No. 16/960,179, filed on Jul. 6, 2020, which is a U.S. National Stage application under 35 U.S.C. § 371 of an International application number PCT/KR2019/000224, filed on Jan. 7, 2019, which is based on and claimed priority under 35 U.S.C. 119(e) of a U.S. Provisional application Ser. No. 62/614,711, filed on Jan. 8, 2018, in the U.S. Patent and Trademark Office, the disclosure of which is incorporated by reference herein in its entirety.

TECHNICAL FIELD

The disclosure relates to a wireless communication system. In particular, the disclosure relates to a method and apparatus for a split between physical layer functions in a wireless communication system.

BACKGROUND ART

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System".

Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system.

In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like.

In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of Things (IoT) where distributed entities, such as things, exchange and process information without human intervention. The Internet of Everything (IoE), which is a combination of IoT technology and Big Data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, Machine-to-Machine (M2M) communication, Machine Type Communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing Information Technology (IT) and various industrial applications.

In line with these developments, various attempts have been made to apply the 5G communication system to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be an example of convergence between the 5G technology and the IoT technology.

Meanwhile, as communication systems evolve, there is increasing growth in demand for splitting base station.

DISCLOSURE OF INVENTION

Technical Problem

In legacy LTE systems, a radio interface protocol stack involves a physical (PHY) layer, a medium access control (MAC) layer, a radio link control (RLC) layer, a packet data convergence protocol (PDCP) layer, and a radio resource control (RRC) layer. Among them, the PHY layer is responsible for mapping transport channels onto physical channels. In detail, the PHY layer is in charge of the procedure of generating and transmitting a radio frequency signal through various operations such as coding/decoding on information bits, modulation/demodulation, hybrid automatic request (HARQ) processing, and time-frequency resource mapping.

However, the hierarchical protocol structure of the legacy LTE system cannot handle efficiently a rapidly increasing number of antennas and a growing channel bandwidth in line with the advance of communication systems, which necessitates an improvement method.

The technical goals to be achieved through the disclosure are not limited to just solving the aforementioned problems, and other unmentioned technical problems will become apparent from the disclosed embodiments to those of ordinary skill in the art.

Solution to Problem

According to a disclosed embodiment, a method for a first physical (PHY) entity to communicate with a second PHY entity in a wireless communication system includes performing communication with the second PHY entity by transmitting or receiving messages to or from the second PHY entity via a fronthaul interface, wherein the first PHY entity performs a lower physical layer processing operation of a base station and the second PHY entity performs a higher physical layer processing operation.

Preferably, the first PHY entity performs the lower physical layer processing operation and a radio frequency (RF) signal processing operation, the lower physical layer processing operation including at least one of Fast Fourier Transform (FFT), cyclic prefix (CP) addition/removal, precoding, beamforming, or physical random access channel (PRACH) filtering and the higher physical layer processing operation including at least one of channel coding/decoding, modulation/demodulation, layer mapping, resource element (RE) mapping, channel estimation, or PRACH detection.

Preferably, the messages include user plane messages and control plane messages, the user plane messages including at least one of a downlink in-phase/quadrature (IQ) message, an uplink IQ message, a sounding reference signal (SRS) message, or a physical random access channel (PRACH) message and the control plane messages including at least one of a resource element (RE) bitmap message, a physical resource block (PRB) bitmap message, a scheduling information message, or a terminal channel information message.

Preferably, a type of the user plane message is indicated by a subtype field value, and a type of the control plane message is indicated by a control type field value in a data field and the subtype field value.

According to a disclosed embodiment, a first physical (PHY) entity communicating with a second PHY entity in a wireless communication system includes a transceiver configured to transmit and receive signals and a controller configured to control to perform communication with the second PHY entity by transmitting or receiving messages to or from the second PHY entity via a fronthaul interface, wherein the first PHY entity performs a lower physical layer processing operation of a base station, and the second PHY entity performs a higher physical layer processing operation.

According to a disclosed embodiment, a method for a second PHY entity to communicate with a first PHY entity in a wireless communication system includes performing communication with the first PHY entity by transmitting or receiving messages to or from the first PHY entity via a fronthaul interface, wherein the first PHY entity performs a lower physical layer processing operation of a base station and the second PHY entity performs a higher physical layer processing operation.

According to a disclosed embodiment, a second physical (PHY) entity communicating with a first PHY entity in a wireless communication system includes a transceiver configured to transmit and receive signals and a controller configured to control to perform communication with the first PHY entity by transmitting or receiving messages to or from the first PHY entity via a fronthaul interface, wherein the first PHY entity performs a lower physical layer processing operation of a base station, and the second PHY entity performs a higher physical layer processing operation.

Advantageous Effects of Invention

The method proposed in the disclosure is advantageous in terms of improving communication efficiency and facilitating management of a base station while reducing implementation complexity of the base station in such a way of splitting functions of the base station.

MODE FOR THE INVENTION

Figure 1:
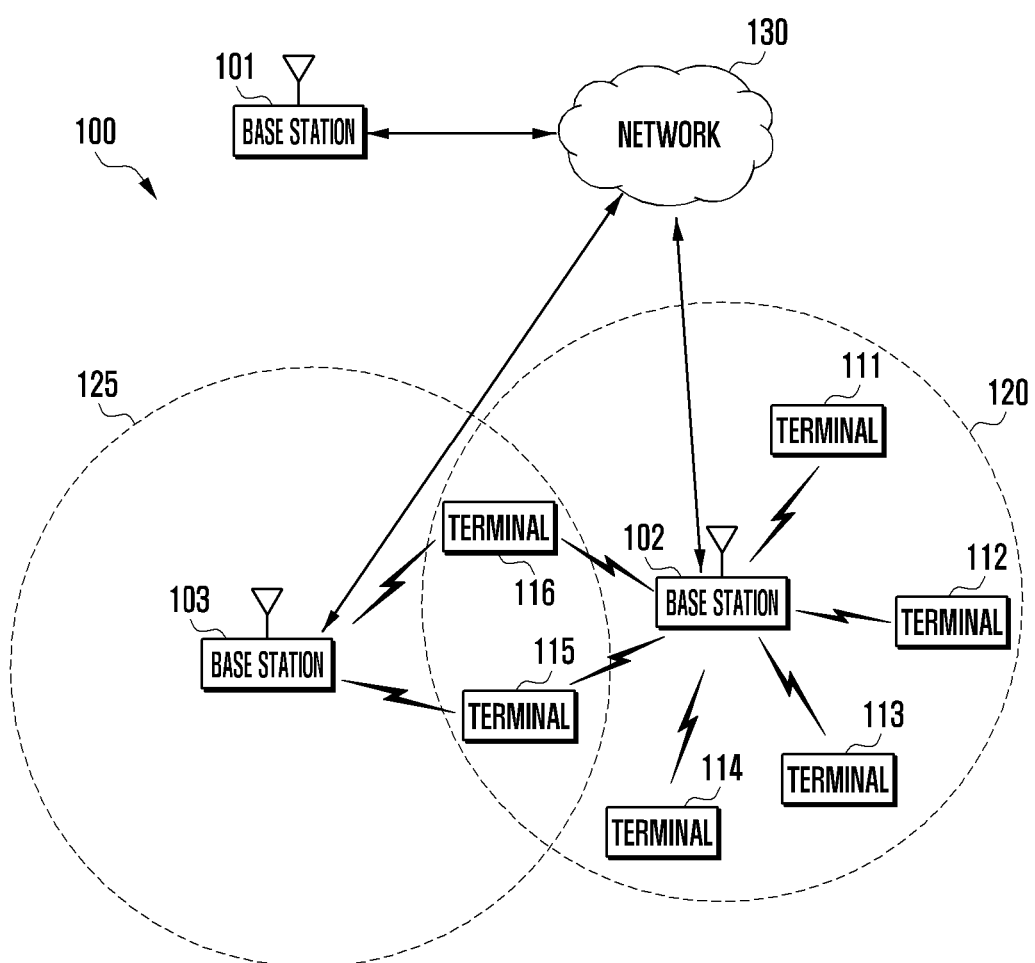
FIG. 1 is a diagram illustrating a wireless network architecture according to a disclosed embodiment.

Exemplary embodiments of the disclosure are described in detail with reference to the accompanying drawings. The same reference numbers are used throughout the drawings to refer to the same or like parts. Detailed descriptions of well-known functions and structures incorporated herein may be omitted to avoid obscuring the subject matter of the disclosure.

Detailed descriptions of technical specifications well-known in the art and unrelated directly to the disclosure may be omitted to avoid obscuring the subject matter of the disclosure. This aims to omit unnecessary description so as to make the subject matter of the disclosure clear.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or they may be performed in reverse order according to their functions.

According to various embodiments of the disclosure, the term "module" means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

It may be advantageous to set forth definitions of certain words and phrases used through the disclosure. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Preferred embodiments are described hereinafter with reference to the accompanying drawings.

FIG. 1 is a diagram illustrating a wireless network architecture according to a disclosed embodiment.

FIG. 1 shows an exemplary wireless network 100 according to a disclosed embodiment. Although the following description is made of the exemplary deployment of the wireless network 100 as shown in FIG. 1, the disclosure may be applicable to other network deployments.

In FIG. 1, the wireless network 100 includes base stations 101, 102, and 103. The base station 101 communicates with the base stations 102 and 103 via at least one network 130. The base stations 102 and 103 may provide a radio access service to terminals 111, 112, 113, 114, 115, and 116 located within their coverages 120 and 125. In FIG. 1, the base stations 101, 102, and 103 may communicate with the terminals 111, 112, 113, 114, 115, and 116 via various radio access technologies (RATs) including 5G new radio (NR), LTE, LTE-A, high speed packet access (HSPA), WiMAX, and Wi-Fi.

In the following description, the term "base station" may mean an entity such as a transmission point (TP), a transmission and reception point (TRP), an enhanced node B (eNB), a gNB, a macro-cell, a femto-cell, and a Wi-Fi access point (AP); the term "terminal" may mean an entity such as user equipment (UE), a mobile station, a subscriber station, a wireless transmission reception unit (WTRU), and a user device.

It is obvious that the deployment of the wireless network 100 can be changed in various manners as described with reference to FIG. 1. For example, the wireless network 100 may include arbitrary numbers of base stations and terminals, and each base station may communicate with one or more terminals to connect the terminals to the network 130.

Figure 2:
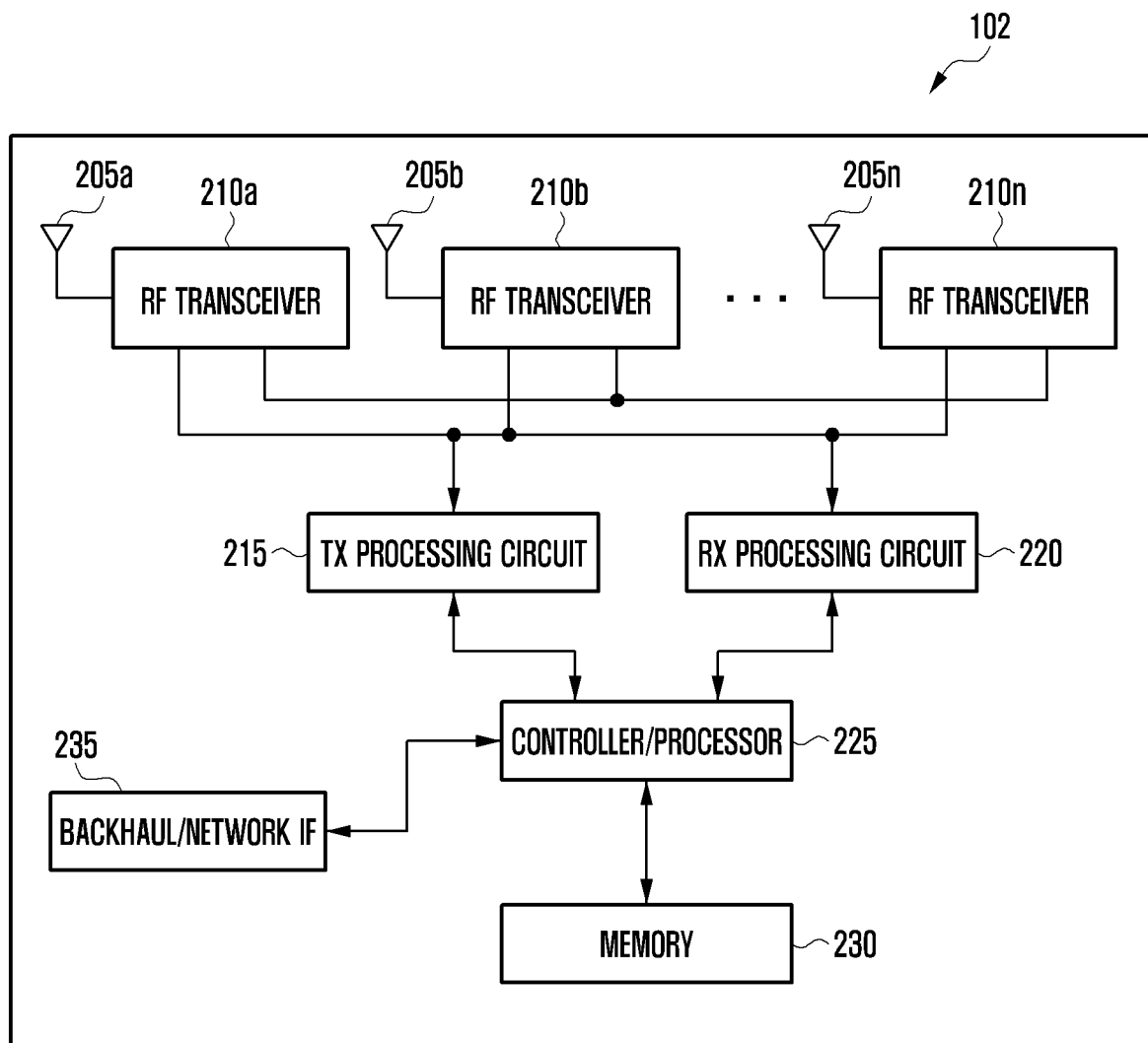
FIG. 2 is a block diagram illustrating a configuration of a base station according to a disclosed embodiment.

FIG. 2 is a block diagram illustrating a configuration of a base station according to a disclosed embodiment. Although the description is made of the exemplary configuration of the base station 102 as shown in FIG. 2, the base station may also be configured to include other components in addition to the components depicted in FIG. 2 or exclude some of the components depicted in FIG. 2. The components constituting the base station 102 as shown in FIG. 2 may be integrated among each other or each subdivided into separate smaller parts.

In the embodiment of FIG. 2, the base station 102 includes a plurality of antennas 205a to 205n, a plurality of RF transceivers 210a to 210n, a transmission (TX) processing circuit 215, and a reception (RX) processing circuit 220. The base station 102 may include a controller/processor 225, a memory 230, and backhaul/network interface 235.

The RF transceivers 210a to 210n receive an RF signal transmitted by another device (e.g., terminal and another base station) by means of the antennas 205a to 205n. The RF transceivers 210a to 210n perform down-conversion on the RF signal to produce a baseband signal. The down-converted signal is send to the RX processing circuit 220, which performs filtering, decoding, and/or digitalization on the downlink signal to produce a baseband signal. The RX processing circuit 220 sends the produced baseband signal to the controller/processor 225, which performs an additional process on the baseband signal.

The TX processing circuit 215 may receive analog or digital data from the controller/processor 215. The TX processing circuit 215 performs encoding, multiplexing, and/or digitalization on the baseband data to produce a baseband signal. The RF transceivers 210a to 210n receive the baseband signal processed by the TX processing circuit 215 and perform up-conversion on the baseband signal to generate an RF signal to be transmitted via the antennas 205a to 205n.

The RF transceivers 210a to 210n may also be referred to, along with at least one of the TX processing circuit 215 and the RX processing circuit 220, as a transceiver.

The controller/processor 225 may include one or more processors for controlling overall operations of the base station 102. For example, the controller/processor 225 may control the RF transceivers 210a to 210n, the RX processing circuit 220, and the TX processing circuit 215 to receive a forward channel signal and transmit a reverse channel signal. The controller/processor 225 may include one or a combination of a circuit and a program for processing an uplink (UL) channel and/or a downlink (DL) channel. For example, the controller/processor 225 may be configured to execute one or more instructions stored in the memory 230.

The controller/processor 225 may be connected to the backhaul/network interface 235. The backhaul/network interface 235 enables the base station 102 to communicate with another device or system via a backhaul link or network. The backhaul/network interface 235 may support wireline or wireless communication.

The memory 230 is connected with the controller/processor 225. The memory 230 may store various types of information or data being processed by the base station 102.

Figure 3:
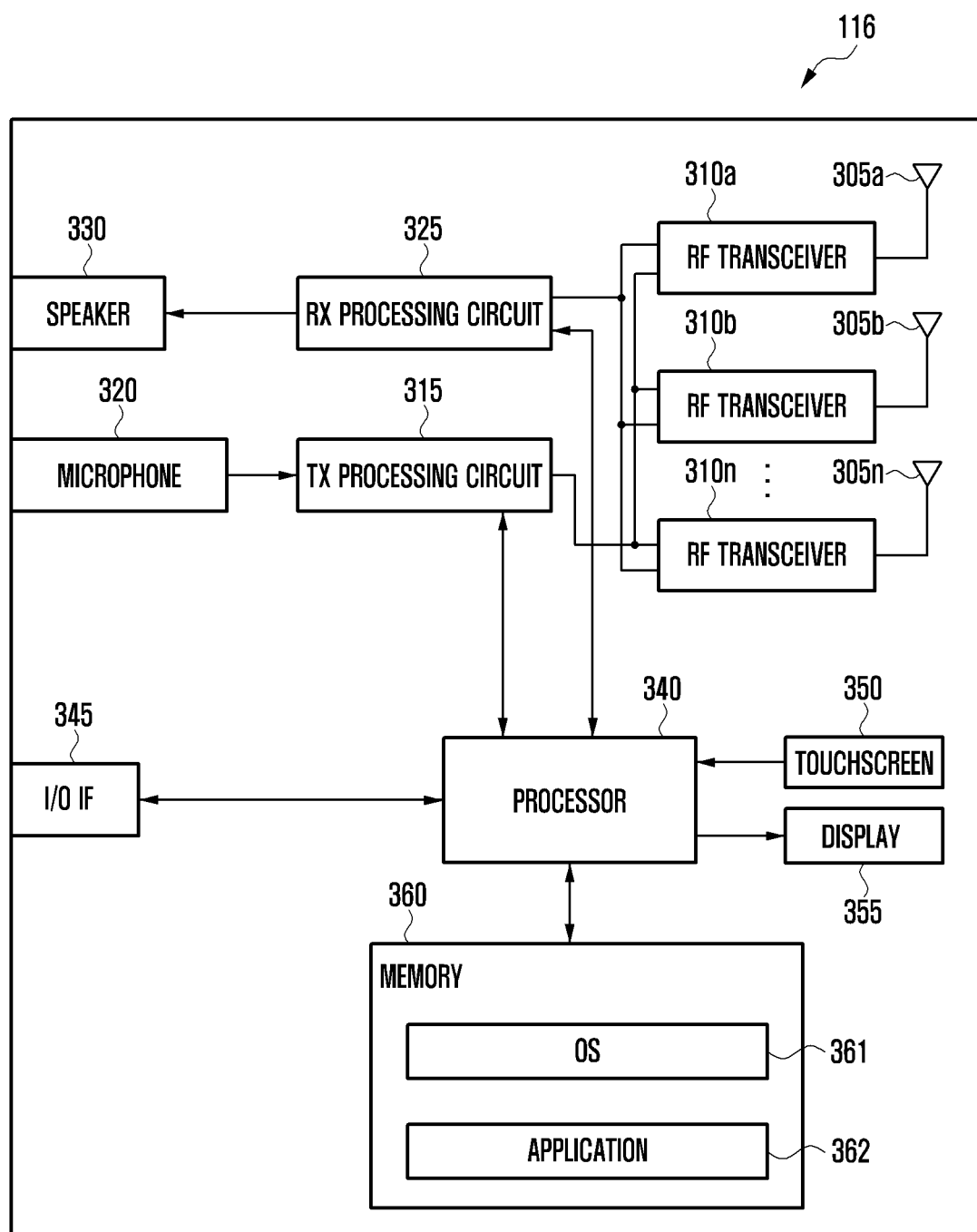
FIG. 3 is a block diagram illustrating a configuration of a terminal according to a disclosed embodiment.

FIG. 3 is a block diagram illustrating a configuration of a terminal according to a disclosed embodiment. Although the description is made of the exemplary configuration of the terminal 116 as shown in FIG. 3, the terminal 116 may also be configured to include other components in addition to the components depicted in FIG. 3 or exclude some of the components depicted in FIG. 3. The components constituting the terminal 11b as shown in FIG. 3 may be integrated among each other or each subdivided into separated smaller parts.

In the embodiment of FIG. 3, the terminal 116 includes one or more antennas 305a to 305n, one or more RF transceivers 310a to 310n, a TX processing circuit 315, and an RX processing circuit 325. The terminal 116 also includes a microphone 320, a speaker 315, an input/output interface (I/O IF) 345, a processor 340, a touchscreen 350, a display 355, and a memory 360, which stores an operating system (OS) 361 and at least one application 362.

The RF transceivers 310a to 310n receive an RF signal transmitted by a base station of a network by means of the antennas 305a to 305n. The RF transceivers 310a to 310n perform down-conversion on the RF signal to produce a baseband signal. The down-converted signal is sent to the RX processing circuit 325, which produces a baseband signal by performing filtering, decoding, and/or digitalization on the down-converted signal. The RX processing circuit 325 may send the processed baseband signal to the processor 340 that performs an additional process on the baseband signal or to the speaker 330 that outputs a sound signal.

The TX processing circuit 325 may receive analog or digital data from the processor 340 or analog or sound data input via the microphone 320. The TX processing circuit 325 performs encoding, multiplexing, and/or digitalization on the baseband data to produce a baseband signal. The RF transceivers 310a to 310n receive the baseband signal from the TX processing circuit and perform up-conversion on the baseband signal to produce an RF signal to be transmitted by the antennas 305a to 305n.

Two or more of the RF transceivers 310a to 310n, the TX processing circuit 315, and the RX processing circuit 325 may be integrated into a component, which may be referred to as a transceiver.

The processor 340 may include one or more processors for controlling overall operations of the terminal 116. For example, the processor 340 may control the RF transceivers 310a to 310n, the RX processing circuit 325, and the TX processing circuit 315 to receive a forward channel signal and transmit a reverse channel signal. The processor 340 may include one or a combination of a circuit and a program for processing a UL channel and/or a DL channel. For example, the processor 340 may be configured to execute one or more instructions stored in the memory 360.

The processor 340 may execute other processes and programs stored in the memory and write data in the memory 360 or read the data out from the memory 360. The processor 340 may execute the application 362 on the OS 361. The processor 340 may be connected to the I/O IF 345 that allows another device to connect to the terminal 116. The I/O IF 345 provides the processor 340 with a communication pathway to other devices.

The processor 340 is connected with the touchscreen 350 and the display 355. A user may input data to the terminal 116 via the touchscreen 350. The display 355 may perform text processing or graphic processing on information and data processed in the terminal 116 to display the information and data in a visualized manner.

The memory 360 is connected with the processor 340. The memory 360 may store various types of information and data processed in the terminal 116.

Figure 4:
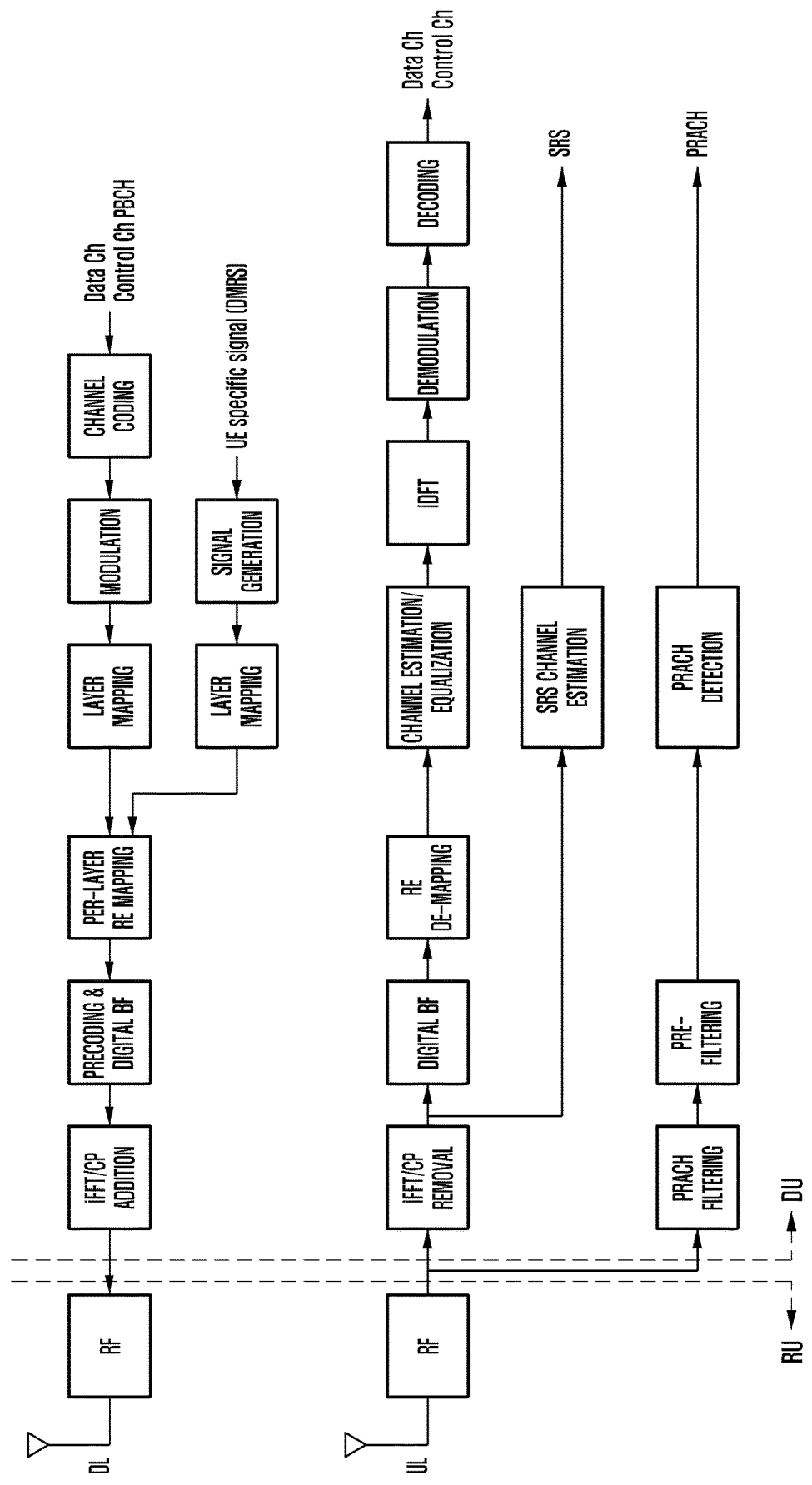
FIG. 4 is a diagram illustrating a physical layer of a base station according to a disclosed embodiment.

FIG. 4 is a diagram illustrating a physical layer of a base station according to a disclosed embodiment. The upper part of FIG. 4 shows a physical layer procedure of the base station for transmitting a downlink signal, and the lower part of FIG. 4 shows a physical layer procedure of the base station for processing a received uplink signal.

In FIG. 4, the physical layer of the base station includes an RF unit (RU) in charge of an RF function and a digital unit (DU) in charge of other functions of the physical layer with the exception of the RF function.

In FIG. 4, the DU of the base station performs channel coding on data channels, control channels, and a physical broadcast channel (PBCH) for DL signal transmission, generates a UE-specific demodulation reference signal (DMRS), and performs layer mapping. The DU performs resource element (RE) mapping per layer, precoding & digital beamforming (BF), and inverse fast Fourier transform/cyclic prefix addition (IFFT/CP addition), and the RU generates an RF signal based on a processing result received from the DU and transmits the RF signal in downlink by means of an antenna.

In FIG. 4, the RU of the base station receives an uplink signal from a terminal, processes the received signal, and sends the processed signal to the DU. The DU performs FFT/CP removal, BF, RE de-mapping, channel estimation/equalization, inverse discrete Fourier transform (IDFT), demodulation, and decoding on the received signal to acquire the data and control channels, or performs uplink channel estimation based on a sounding reference signal (SRS) acquired from the FFT/CP removed data, or performs physical random access channel (PRACH) detection through PRACH filtering and pre-filtering on the signal received from the RU.

With the evolution of the 3GPP standard, a massive MIMO antenna structure is considered as a promising technology for NR communication systems operating in an ultra-high frequency band above 6 GHz to meet the requirements of increased radio communication channel bandwidth. In this regard, on the basis of the above-described RU-DU configuration in the physical layer of the base station, a fronthaul bandwidth between the RU and DU increases abruptly. Services being provided in such a next generation communication system are characterized by exponentially increasing the amount and diversified types of information to be processed and requirements for communication responsiveness and high speed signal processing. There is therefore a need of a new proposal on the physical layer of the base station for efficient communication by reflecting characteristics of such a communication environment.

Figure 5:
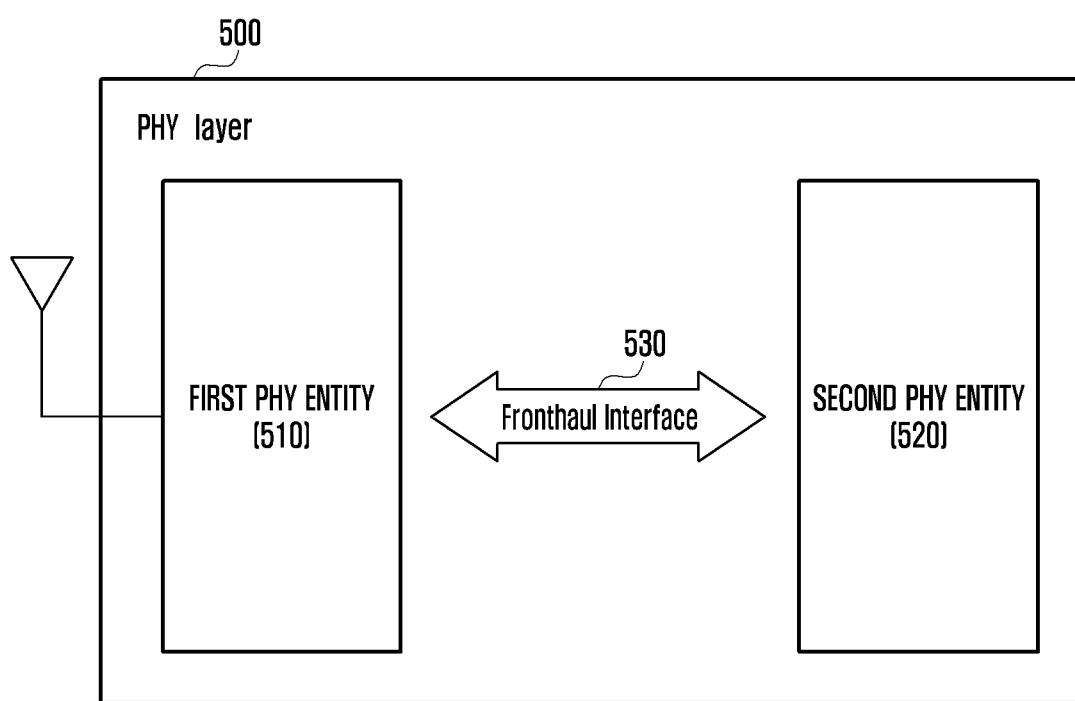
FIG. 5 is a block diagram illustrating a configuration of a split physical layer according to a disclosed embodiment.

FIG. 5 is a block diagram illustrating a configuration of a split physical layer according to a disclosed embodiment. In the embodiment of FIG. 5, the physical layer 500 of the base station is configured to have two separate entities through a functional split.

The various functions of the physical layer 400 that have been described with reference to FIG. 4 may be functionally split in various manners. The physical layer 400 may be configured to have a first PHY entity 510 including at least one of the functions of the physical layer 500 and a second PHY entity 520 including at least one of the remaining functions, and the first and second PHY entities are connected via a fronthaul interface 530 formed therebetween.

As shown in FIG. 5, the first PHY entity 510 is connected with an antenna and responsible for RF functions and it may be referred to as low PHY layer. The second PHY entity 520 is responsible for the remaining functions with the exception of the function of the first PHY entity 510 and it may be referred to as high PHY layer.

Descriptions are made hereinafter in detail of the configurations of the first and second PHY entities 510 and 520.

Figure 6A:
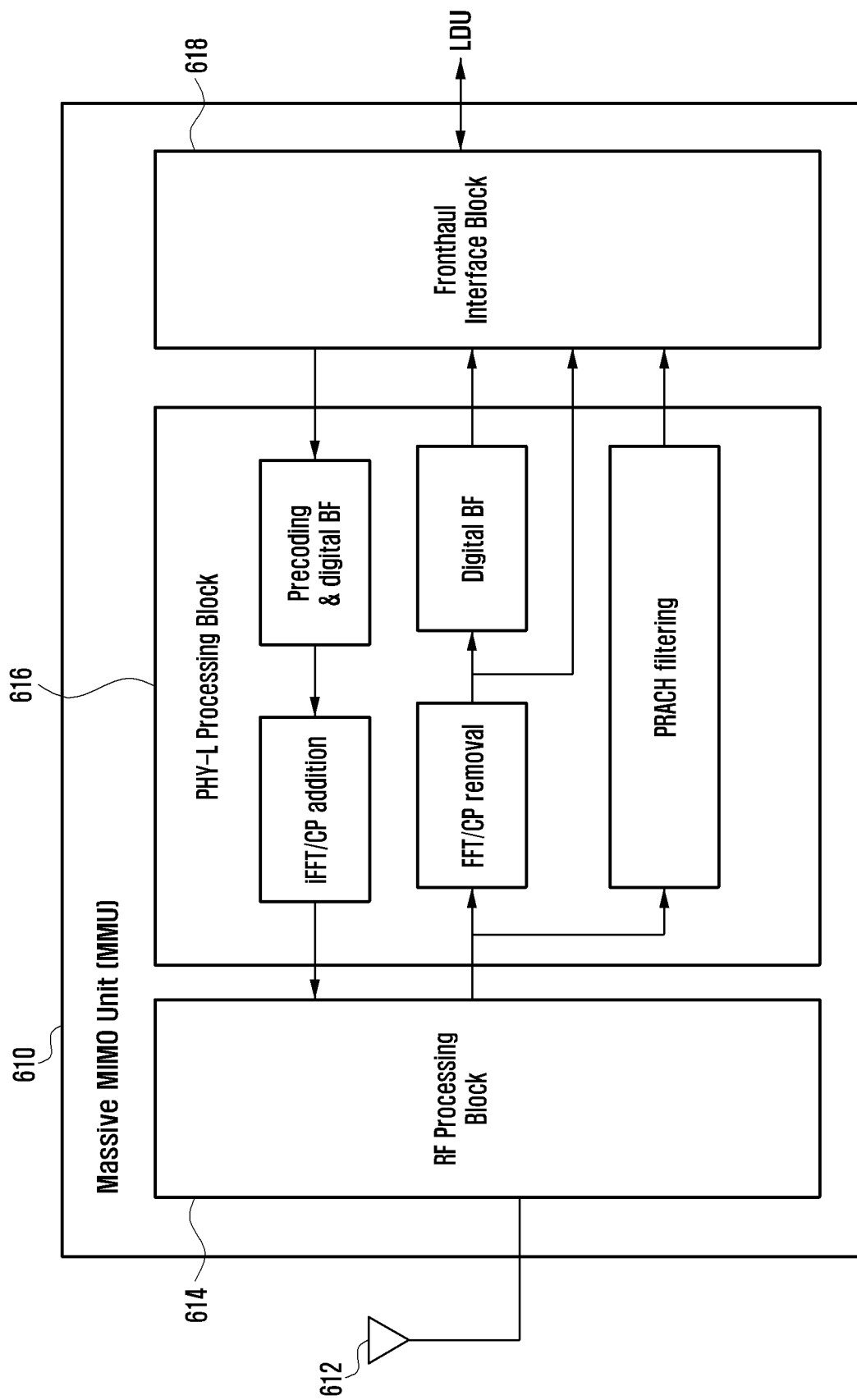
FIG. 6A is a block diagram illustrating a configuration of a split physical layer according to another disclosed embodiment.
Figure 6B:
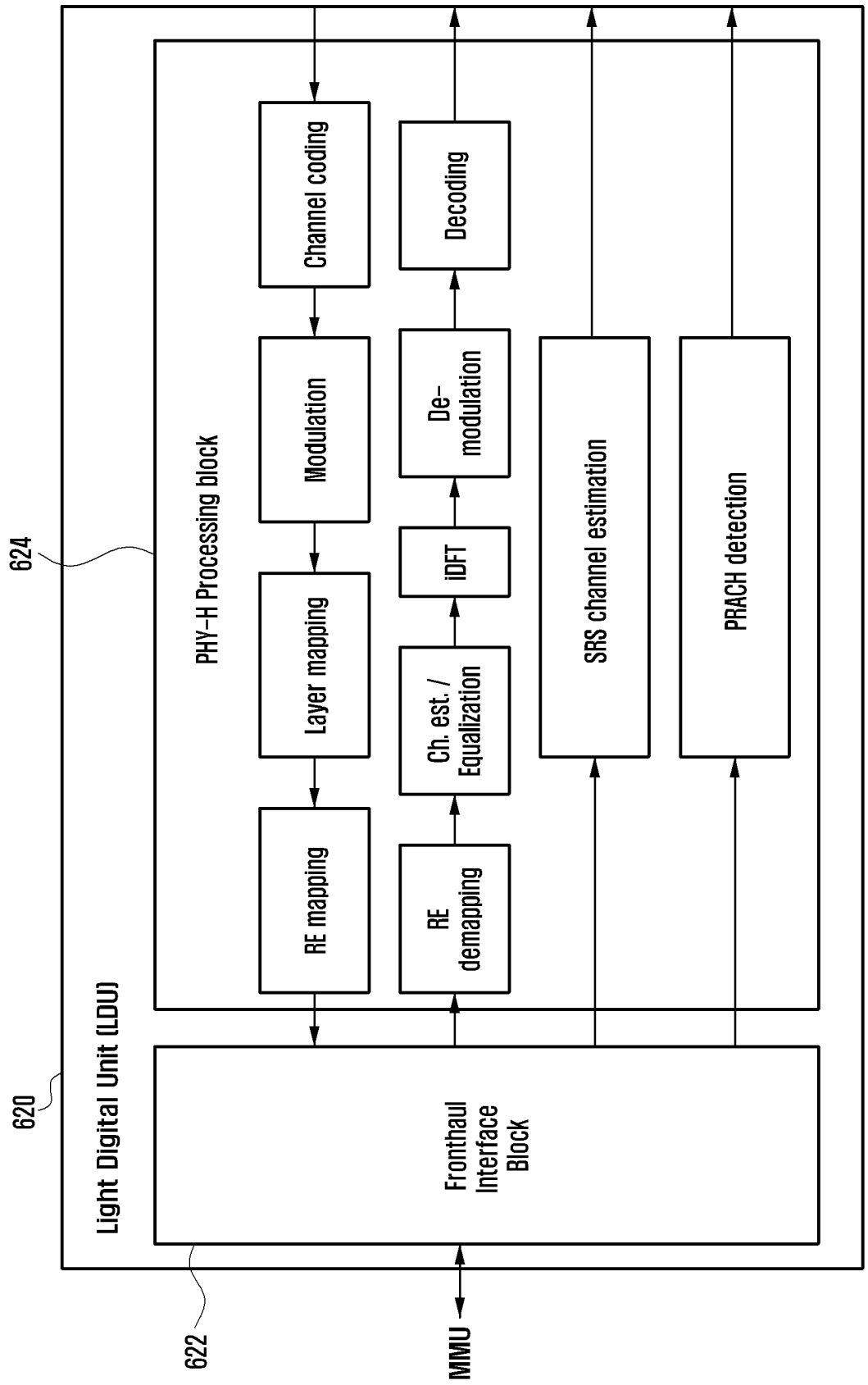
FIG. 6B is a block diagram illustrating a configuration of a split physical layer according to another disclosed embodiment.

FIG. 6A is a block diagram illustrating a configuration of a split physical layer according to another disclosed embodiment, and FIG. 6B is a block diagram illustrating a configuration of a split physical layer according to another disclosed embodiment.

FIG. 6A shows a detailed configuration of the first PHY entity 510 described with reference to FIG. 5. The first PHY entity in charge of one or more functions including the RF function among the physical layer functions of the base station, which may also be referred to as a massive MIMO unit (MMU) 610, includes an RF processing block 614 connected to an antenna 614 and performing RF processing, a PHY-L processing block 616 for performing some functions (i.e., lower physical layer functions) of the physical layer, and a fronthaul interface block 618 for communication with a second PHY entity.

The operations being performed by the RF processing block 614 and the PHY-L processing block 616 have been already described with reference to FIGS. 2 and 4. For example, the RF processing block 614 performs RF frontend operations such as power amplification, low noise amplification (LNA), ADC/DAC conversion, and uplink/downlink switching. For example, the first PHY entity 610 may perform FFT/IFFT, precoding, digital beamforming, and PRACH filtering by means of the PHY-L processing block 616.

Meanwhile, the first PHY entity (or MMU) 610 communicates messages with the second PHY entity (or LDU that is described later) by means of the fronthaul interface 618. The fronthaul interface block 618 may send the second PHY entity a signal produced by processing an RF signal in the first PHY entity 610 and process a signal from the second PHY entity and send the processed signal to the RF processing block 614 in order for the RF processing block 614 to produce an RF signal. For example, the fronthaul interface block 618 of the first PHY entity 610 may perform packetization/depacketization on the messages being exchanged with the second PHY entity 620 for communication via an Ethernet protocol.

FIG. 6B shows a detailed configuration of the second PHY entity described with reference to FIG. 5. The second entity in charge of one or more functions with the exception of the RF function among the physical layer functions of the base station, which may also be referred to as a light digital unit (LDU) 620, includes a fronthaul interface block 622 for communication with the first PHY entity (or MMU) and a PHY-H processing block 624 for performing some functions (i.e., higher physical layer functions) of the physical layer. The operations being performed by the PHY-H processing block 624 have been already described with reference to FIGS. 2 and 4. For example, the second PHY entity 620 may perform channel coding/decoding, modulation/demodulation, channel estimation/equalization, RE mapping/de-mapping, and layer mapping by means of the PHY-H processing block 624.

Meanwhile, the second PHY entity (or LDU) 620 communicates messages with the first PHY entity (or MMU) by means of the fronthaul interface block 622. The fronthaul interface block 622 may process a signal received from the first PHY entity 610 or send a signal to be transmitted to the first PHY entity 610. For example, the fronthaul interface block 622 of the second PHY entity 620 may perform packetization/depacketization on the messages being exchanged with the first PHY entity 610 for communication via an Ethernet protocol.

As described with reference to FIGS. 6A and 6B, by splitting the physical layer functions into the first PHY entity (or MMU) and the second PHY entity (or LDU), it is possible to reduce a burden of the fronthaul bandwidth between the first and second PHY entities in comparison with the RU-DU configuration described with reference to FIG. 4. Furthermore, because the MMU is responsible for some physical layer functions, it may be possible to reduce a burden caused by frequent replacement of the MMU as is necessary for compliance with the evolving standard, especially when it has been deployed on the rooftop of a building or a telephone pole.

As described with reference to FIGS. 6A and 6B, the first PHY entity (i.e., MMU) and the second PHY entity (i.e., LDU) may be established as physically separate devices responsible for some physical layer functions of their own. That is, the first and second PHY entities may be established as separate hardware devices communicating with each other through a wireline or wireless link via a fronthaul interface. It may also be possible to establish first and second PHY entities that are logically separated in a hardware device.

Figure 7:
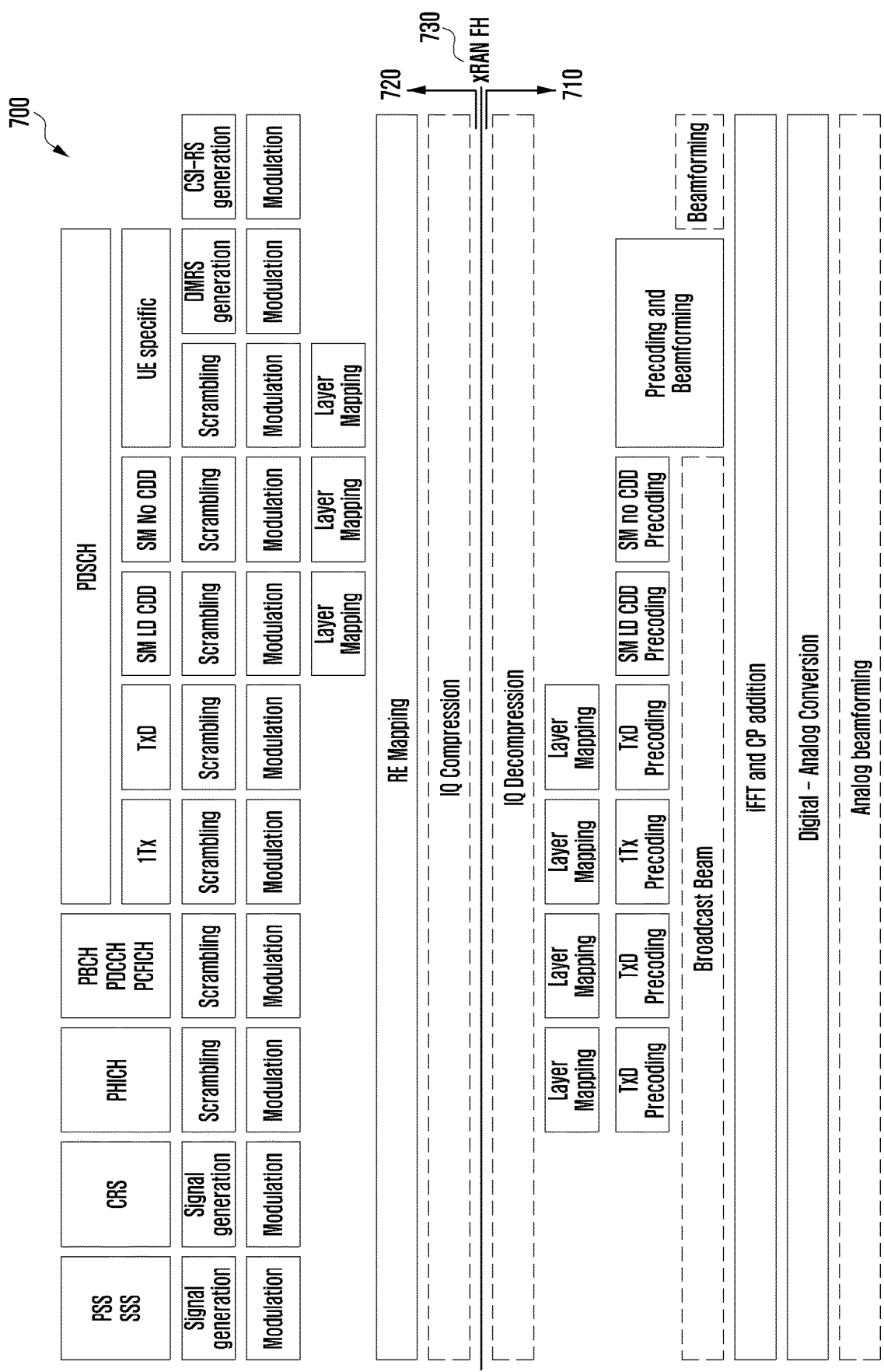
FIG. 7 is diagram illustrating split physical layer architecture according to a disclosed embodiment.
Figure 8:
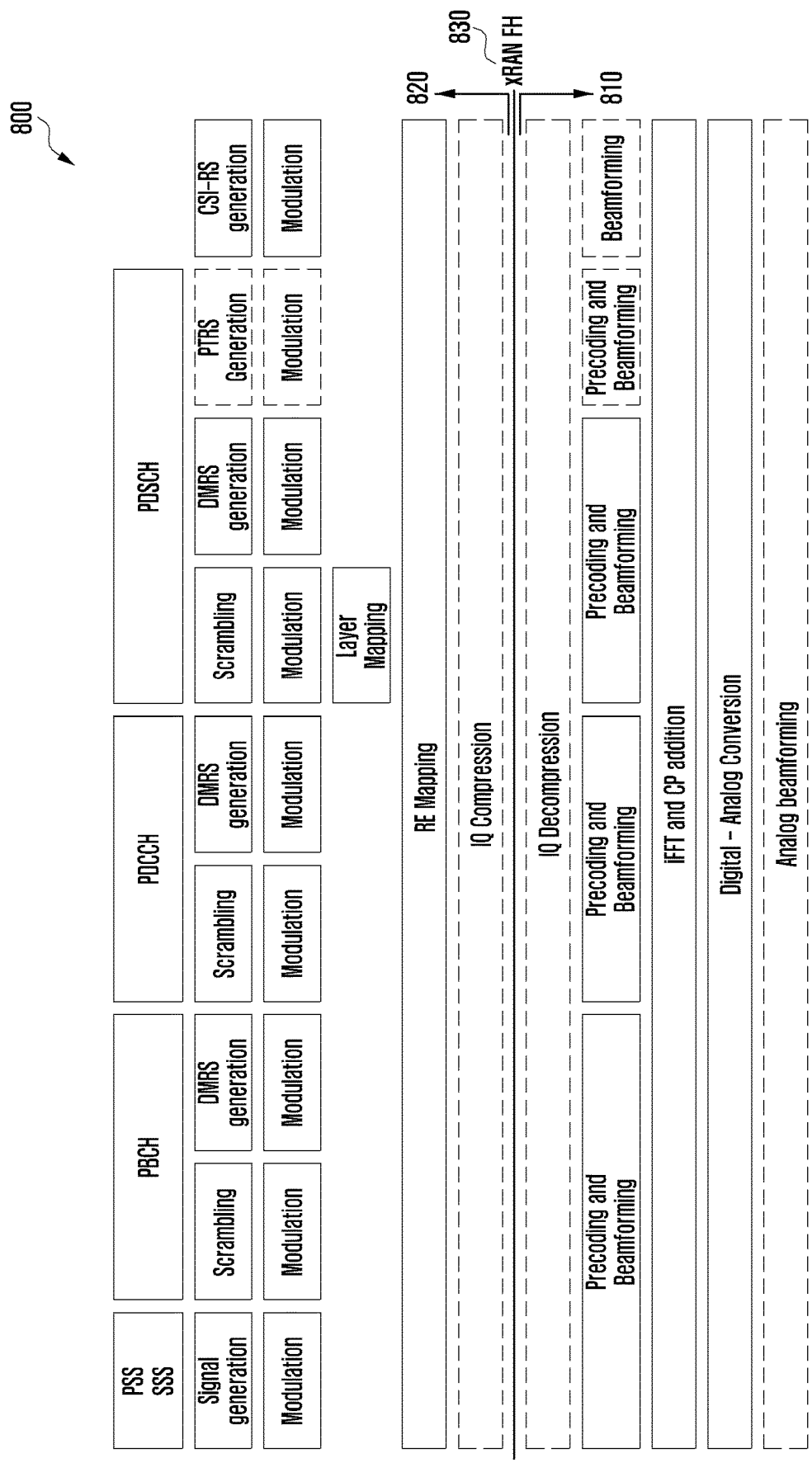
FIG. 8 is diagram illustrating split physical layer architecture according to another disclosed embodiment.
Figure 9:
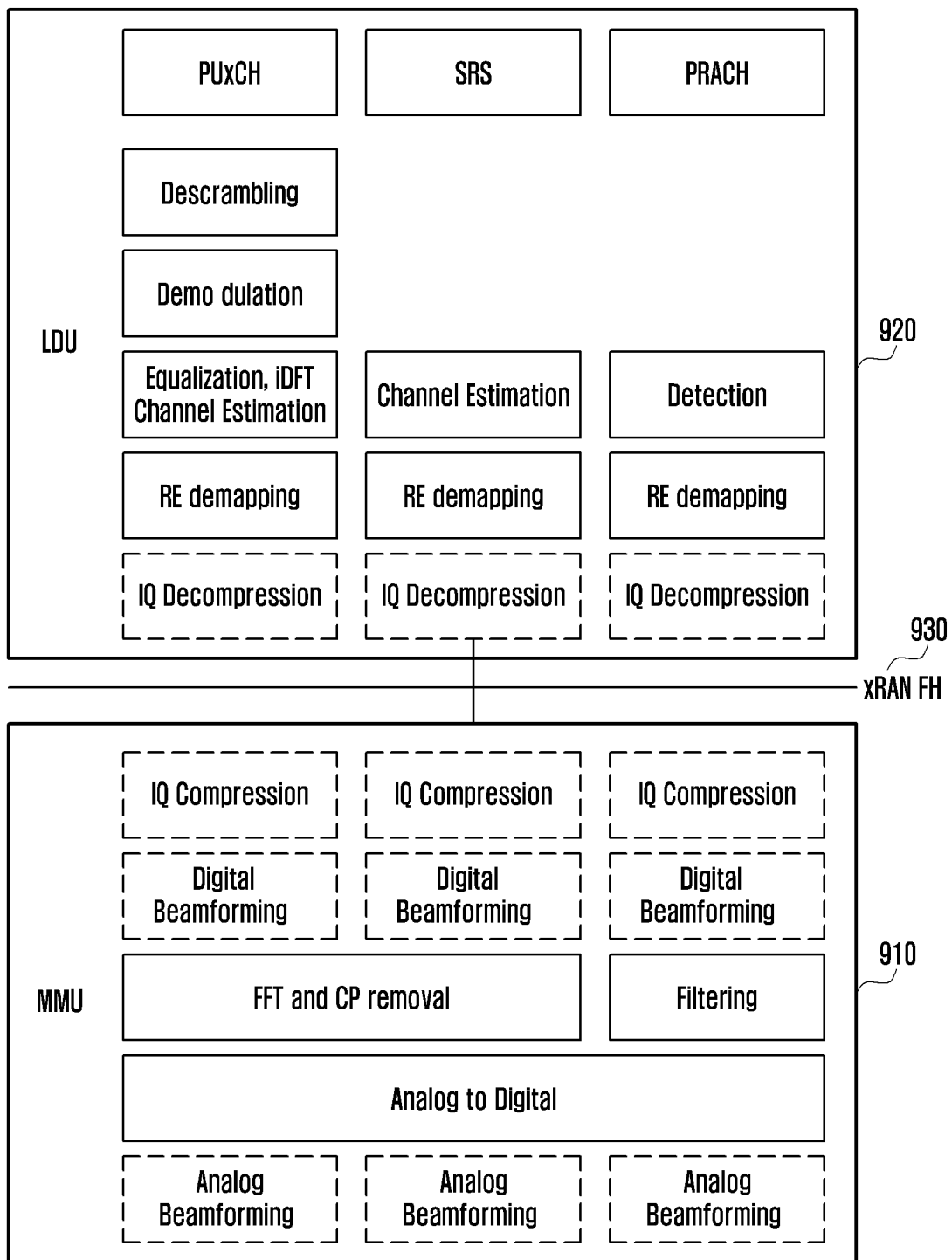
FIG. 9 is diagram illustrating split physical layer architecture according to another disclosed embodiment.

FIGS. 7, 8, and 9 are diagrams illustrating split physical layer architectures according to a disclosed embodiment. FIGS. 7 and 8 each show exemplary architectures of the split physical layer for downlink transmission, and FIG. 9 shows an exemplary architecture of the split physical layer for uplink transmission.

FIG. 7 shows an exemplary split physical layer architecture for applying the split physical layer described with reference to FIGS. 6A and 6B to an LTE/LTE-A communication system. That is, the split physical layer architecture 700 of FIG. 7 shows the split physical layer implemented in an eNB as a base station of the LTE/LTE-A communication system. In FIG. 7, the physical layer of the eNB may be split into a first PHY entity (or MMU) 710 and a second PHY entity (or LDU) 720, which are connected to each other via a fronthaul 730. The fronthaul 730 may also be referred to as xRAN fronthaul (FH).

FIG. 8 shows an exemplary split physical layer architecture for applying the split physical layer described with reference to FIGS. 6A and 6B to an NR communication system. That is, the split physical layer architecture 800 of FIG. 8 shows the split physical layer implemented in a gNB as a base station of the NR communication system. In FIG. 8, the physical layer of the gNB may be split into a first PHY entity (or MMU) 810 and a second PHY entity (or LDU) 820, which are connected to each other via a fronthaul 830 similar to that in FIG. 7.

FIG. 9 shows detailed physical layer operations along with signaling between a first PHY entity (or MMU) 910 and a second PHY entity (or LDU) 920 configured as described with reference to FIGS. 6A and 6B via a fronthaul 930.

The first PHY entity responsible for some functions including the RF function among the physical layer functions and the second PHY entity responsible for remaining physical layer functions have been described above. Although the description has been that the first and second PHY entities may be respectively referred to as MMU and LDU, other names can be used to specify the entities. For example, in association with a central unit-distributed unit (CU-DU) split in which all of the layers of the base station are split, the first and second PHY entities may be referred to as distributed unit lower layer part (DU-L) and distributed unit higher layer part (DU-H), respectively. As another example, in association with the RU-DU split of physical layer functions, the first and second PHY entities may be referred to as radio unit (RU) and lower layer split-central unit (LLS-CU), respectively. It is obvious that the first and second PHY entities can be called by other names.

Hereinabove, the description has been made in detail of the split of the physical layer functions of the base station. Descriptions are made hereinafter in detail of the messages being exchanged and signaling procedure between the first and second PHY entities.

Figure 10:
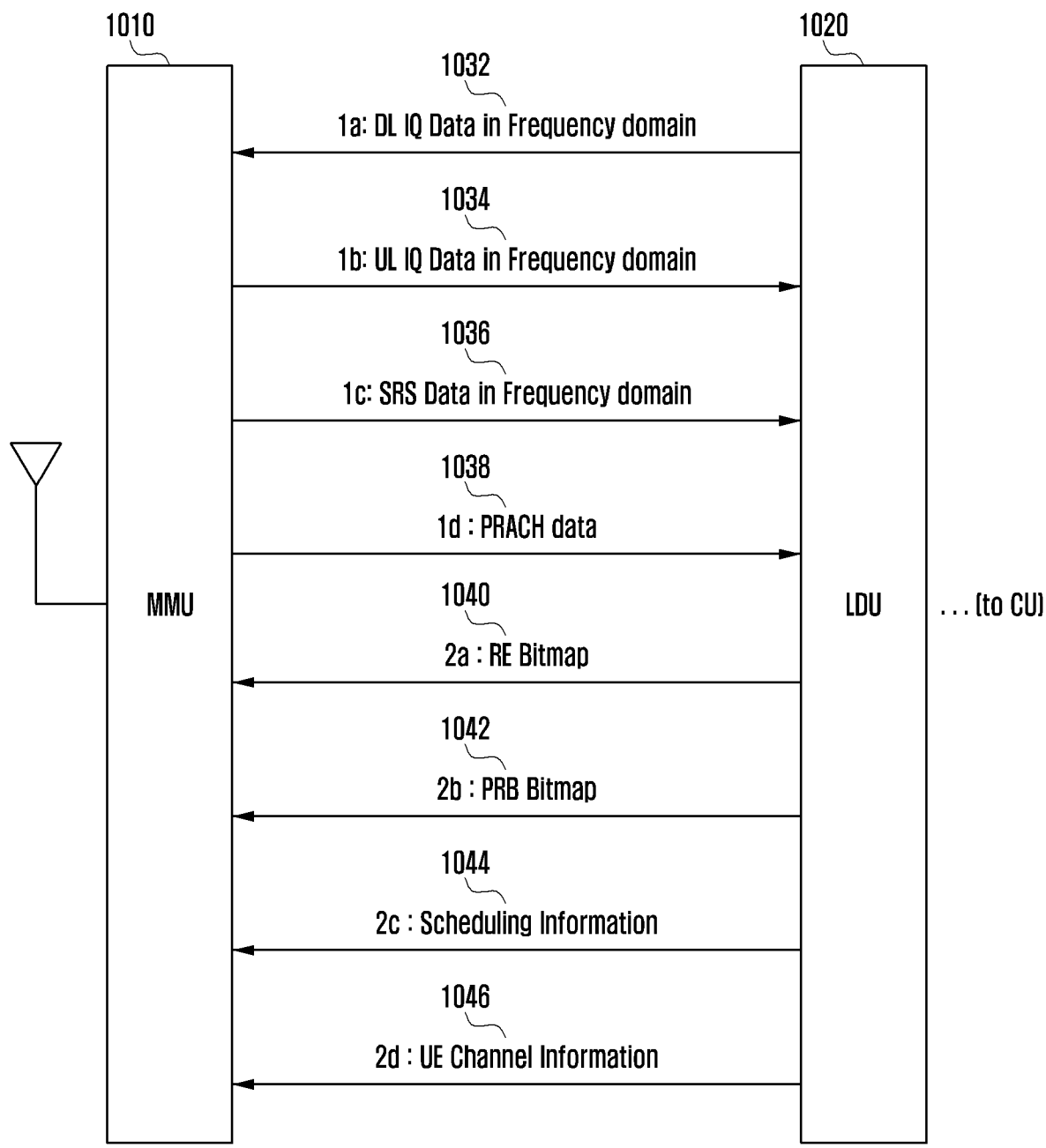
FIG. 10 is a diagram illustrating message flows between two PHY entities according to a disclosed embodiment.

FIG. 10 is a diagram illustrating message flows between two PHY entities according to a disclosed embodiment. Messages being exchanged between a first PHY entity (or MMU) 1010 and a second PHY entity (or LDU) 1020 may be sorted into user plane messages and radio-specific control plane messages.

The user plane messages being communicated between the first and second PHY entities 1010 and 1020 carry data to be transmitted to a terminal or data received from the terminal. According to an embodiment, the user plane messages may include an in-phase/quadrature (IQ) message 1032, an uplink IQ message 1034, a sounding reference signal (SRS) message 1036, and a physical random access channel (PRACH) message 1038. According to an embodiment, the control plane messages may include an RE bitmap message 1040, a physical resource block (PRB) bitmap message 1042, a scheduling information message 1044, and a UE channel information message 1046.

The aforementioned messages are described in detail hereinafter.

The user plane messages abide by a message format defined in the IEEE standard 1914.3. The type of a user plane message is indicated by a subtype field value in a radio-over-Ethernet (ROE) header. Table 1 shows subtype field values and types of user plane messages.

TABLE 1

| Subtype field | Mapping | Description |
| --- | --- | --- |
| 0000 0000b | RoE Control sub type | Control packet between the RoE control node and RoE controlled node. |
| 0000 0001b | Reserved | Reserved |
| 0000 0010b | RoE Structure-agnostic data sub type | Data payload packet with RoE common frame header and structure-agnostic payload. |
| 0000 0011b | RoE Structure-aware CPRI data sub type | Data payload packet with RoE common frame header and structure-aware CPRI data payload. |
| 0000 0100b | RoE Slow C&M CPRI sub type | C&M payload packet with common RoE frame header and structure-aware CPRI Slow C&M payload. |
| 0000 0101b 0000 1111b | Reserved | Reserved for future sub types. |
| 0001 0000b | RoE Native time domain data sub type | Time domain data payload packet with RoE common frame header. |
| 0001 0001b | RoE Native frequency domain data sub type | Frequency domain data payload packet with RoE common frame header. |
| 0001 0010b | RoE Native PRACH data sub type | PRACH IQ data payload with common frame header |
| 0001 0011b | SRS subtype | SRS IQ data payload |
| 0001 0100b 0001 0111b | Reserved | Reserved for future sub types. |
| 0001 1000b | Radio specific control subtype | Radio specific control information |
| 0001 0101b 1111 1011b | Reserved | Reserved for future sub types. |
| 1111 1100b- 1111 1111b | Experimental | Reserved for experimental types. |

In Table 1, the subtype field values 00010001b, 00010010b, and 00010011b may indicate the IQ, PRACH, and SRS messages, respectively.

The control plane messages also abide by a message format defined in the IEEE standard 1914.3. The type of a control plane message may be indicated by a combination of the subtype field value in the ROE header and a radio-specific (RS) control header field value in an RS control header of the data. For example, in Table 1, the subtype field value 00011000b may indicate a control plane message, and the subtype of the control message may be indicated by an RS control type field value as shown in Table 2.

TABLE 2

| RS control type field | Mapping | Description |
| --- | --- | --- |
| 0000 0000b | RE bitmap | Information about beam weights per RE |
| 0000 0001b | PRB bitmap | Information for indicating whether each RB is used for cell-specific beamforming or for UE-specific beamforming |
| 0000 0010b | Scheduling information | Information for indicating which UE is allocated to each RB |
| 0000 0011b | UE channel information | UE channel information obtained from SRS data |
| 0000 0100b 1111 1111b | Reserved | For future use |

Tables 1 and 2 are illustrative of exemplary embodiments of the tables for use in indicating the type of a message between the first and second PHY entities. That is, the type of a message being exchanged between the first and second PHY entities may be indicated in a different manner, by a different field, or with a different value.

Hereinafter, detailed descriptions are made of the message structures with reference to FIGS. 11 to 19.

Figure 11:
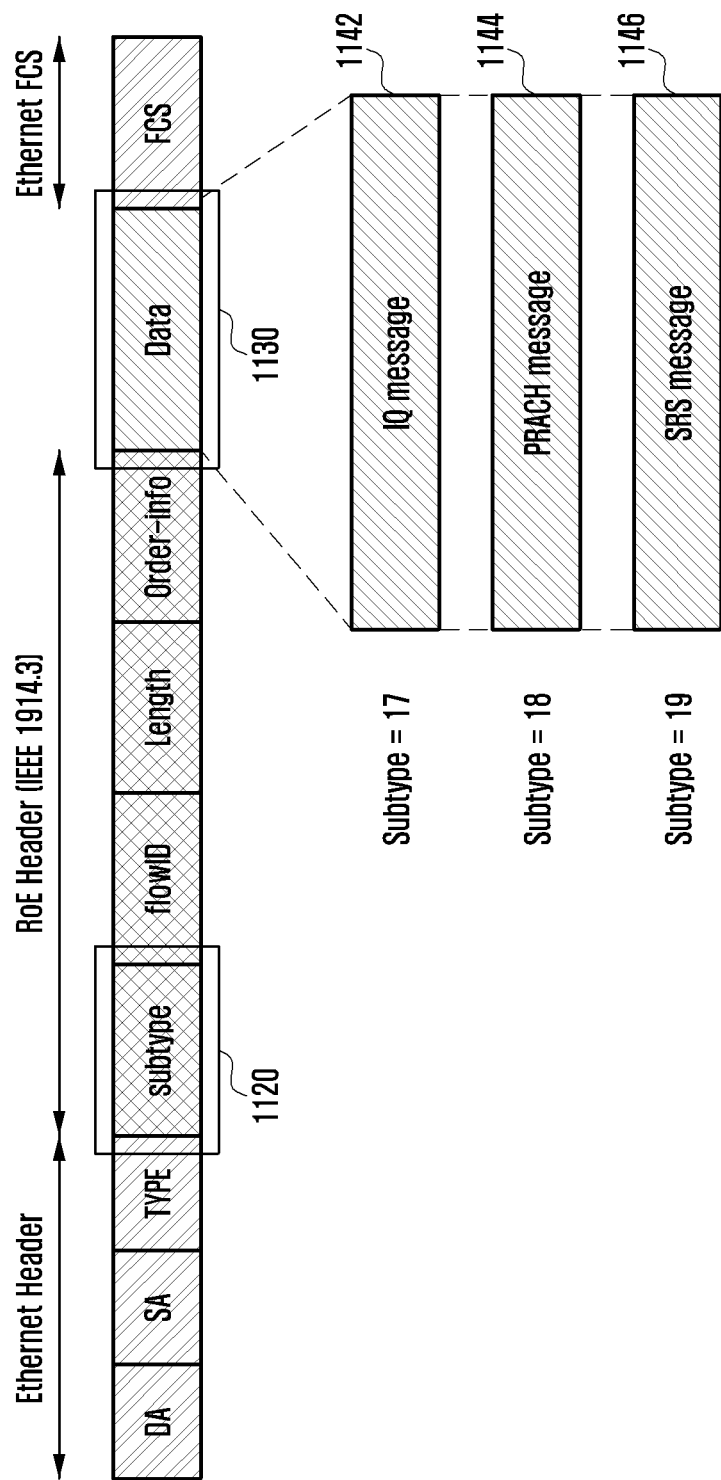
FIG. 11 is a diagram illustrating a message structure according to a disclosed embodiment.

FIG. 11 is a diagram illustrating a structure of a user plane message according to a disclosed embodiment. In the message structure shown in FIG. 11, the subtype field 1120 in the ROE header may be set to a value indicative of inclusion of a user plane message in the data field 1130 of the message. The value of the subtype field 1120 may also indicate the type of the user plane message.

In the embodiment of FIG. 11, the subtype field 1120 may be set to 17 (00010001b in Table 1) indicative of inclusion of an IQ message 1142 in the data field 1130, 18 (00010010b in Table 1) indicative of inclusion of a PRAC message 1144 in the data field 1130, or 19 (00010011b in Table 1) indicative of inclusion of an SRS message 1146) in the data field 1130.

Figure 12:
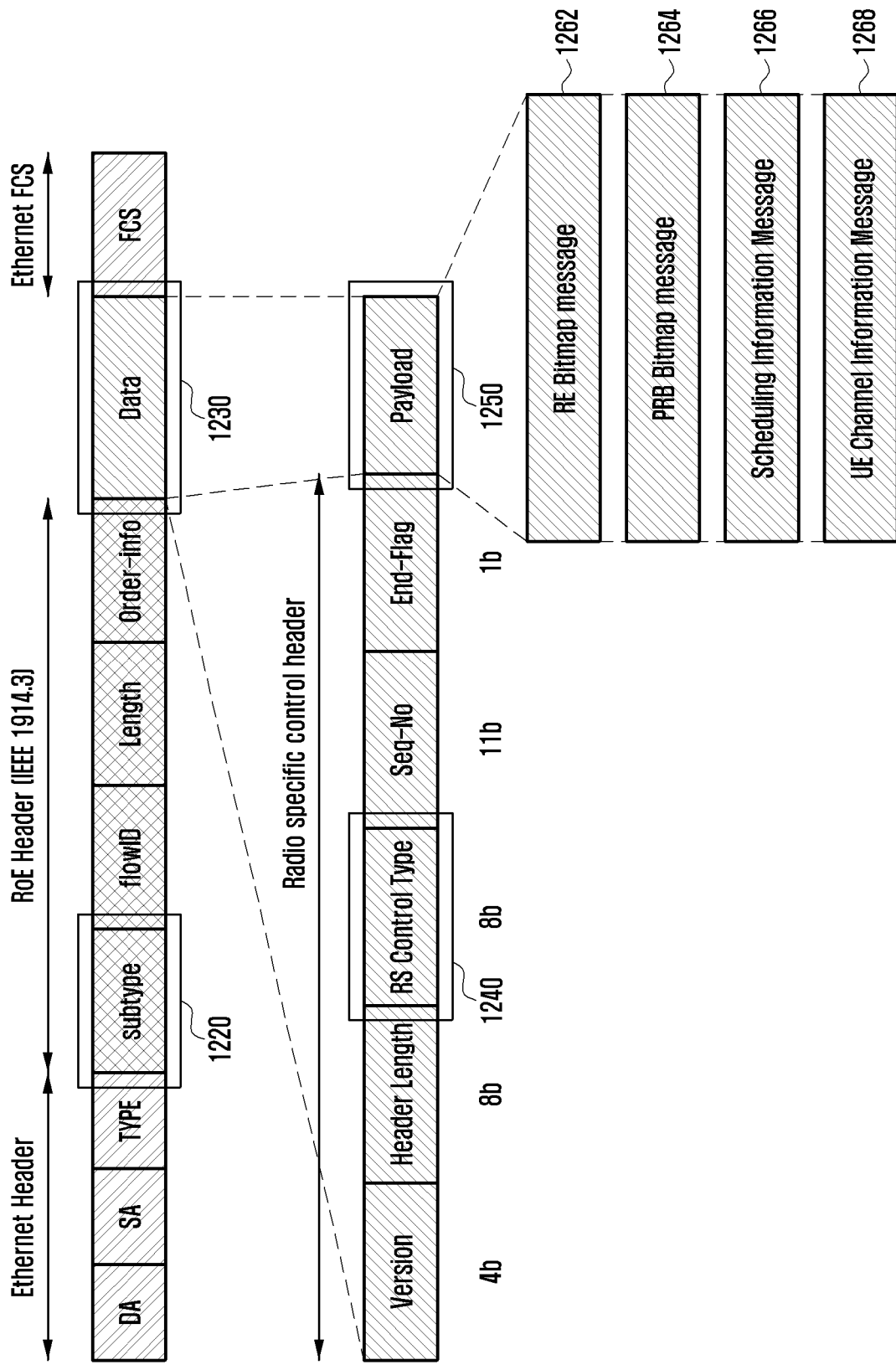
FIG. 12 is a diagram illustrating another message structure according to a disclosed embodiment.

FIG. 12 is a diagram illustrating a structure of a control plane message according to a disclosed embodiment. In the message structure shown in FIG. 12, the subtype field 1220 of the ROE header may be set to a predetermined value to indicate inclusion of a control plane message in the data field 1230. The subtype field 1220 is set to a value (e.g., 00011000b in Table 1) indicative of the inclusion of a control plane message, the RS control type field 1240 in the data field 1230 may be set to a value indicative of the type of data included in the payload 1250.

For example, the RS control type field 1240 may be set to one of the values listed in Table 2 to indicate inclusion of an RE bitmap message 1262, a PRB bitmap message 1264, a scheduling information message 1266, or a UE channel information message 1268 in the payload 1250.

Figure 13:
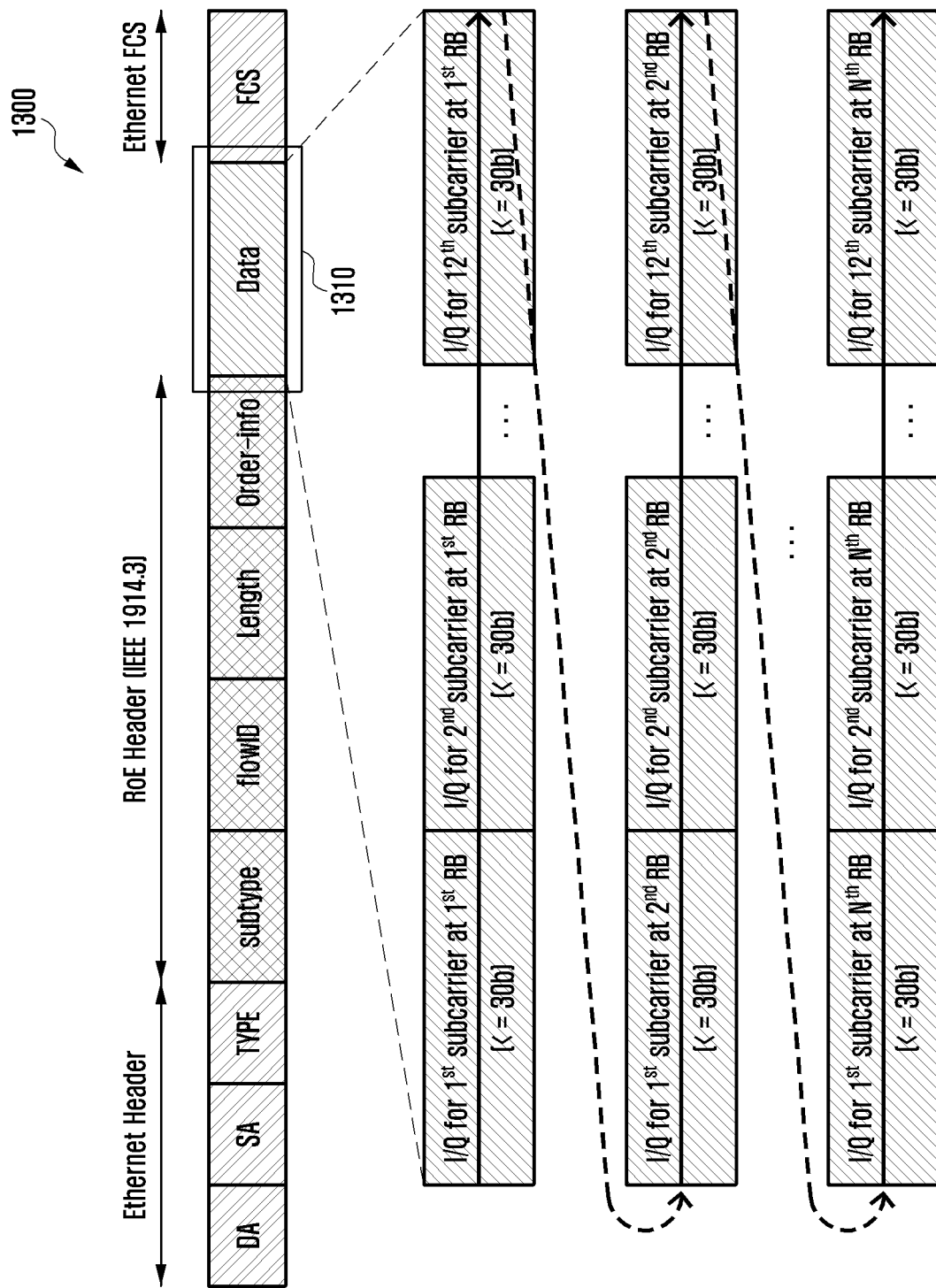
FIG. 13 is a diagram illustrating another message structure according to a disclosed embodiment.

FIG. 13 is a diagram illustrating a detailed format of an IQ message. The IQ message 1300 may be used to convey frequency domain IQ samples in uplink or downlink. The data field 1310 of the IQ message 1300 may contain IQ values for the first subcarrier of the first RB to the $12^{th}$ subcarrier of the $N^{th}$ RB, the IQ values being packetized in order; each IQ value may be represented by less than 30 bits.

The number of bits for representing an IQ value may be preconfigured between the first and second PHY entities during a cell setup phase.

Figure 14:
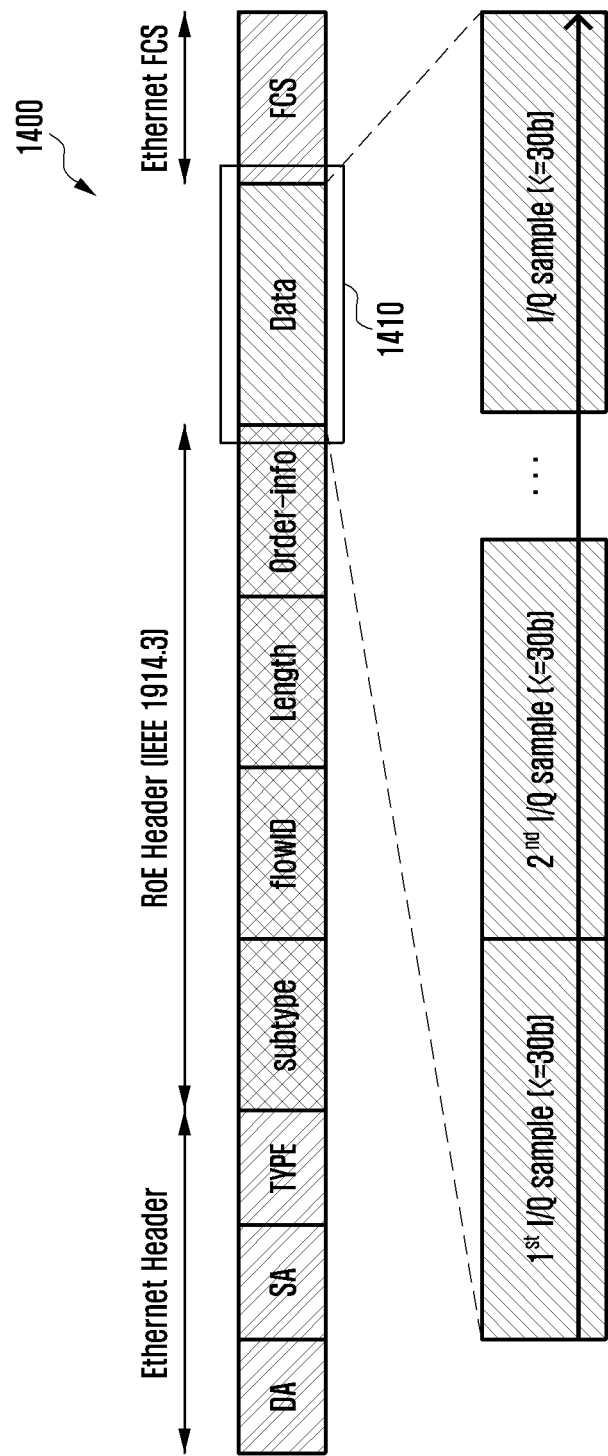
FIG. 14 is a diagram illustrating another message structure according to a disclosed embodiment.

FIG. 14 is a diagram illustrating a detailed format of a PRACH message. The PRACH message 1400 may be used to convey time domain (or frequency domain) PRACH IQ samples in uplink. The data field 1410 of the PRACH message 1400 may contain IQ samples packetized in a time domain sampling order; each IQ value may be represented by less than 20 bits. The number of bits for representing an IQ value may be preconfigured between the first and second PHY entities during a cell setup phase.

Figure 15:
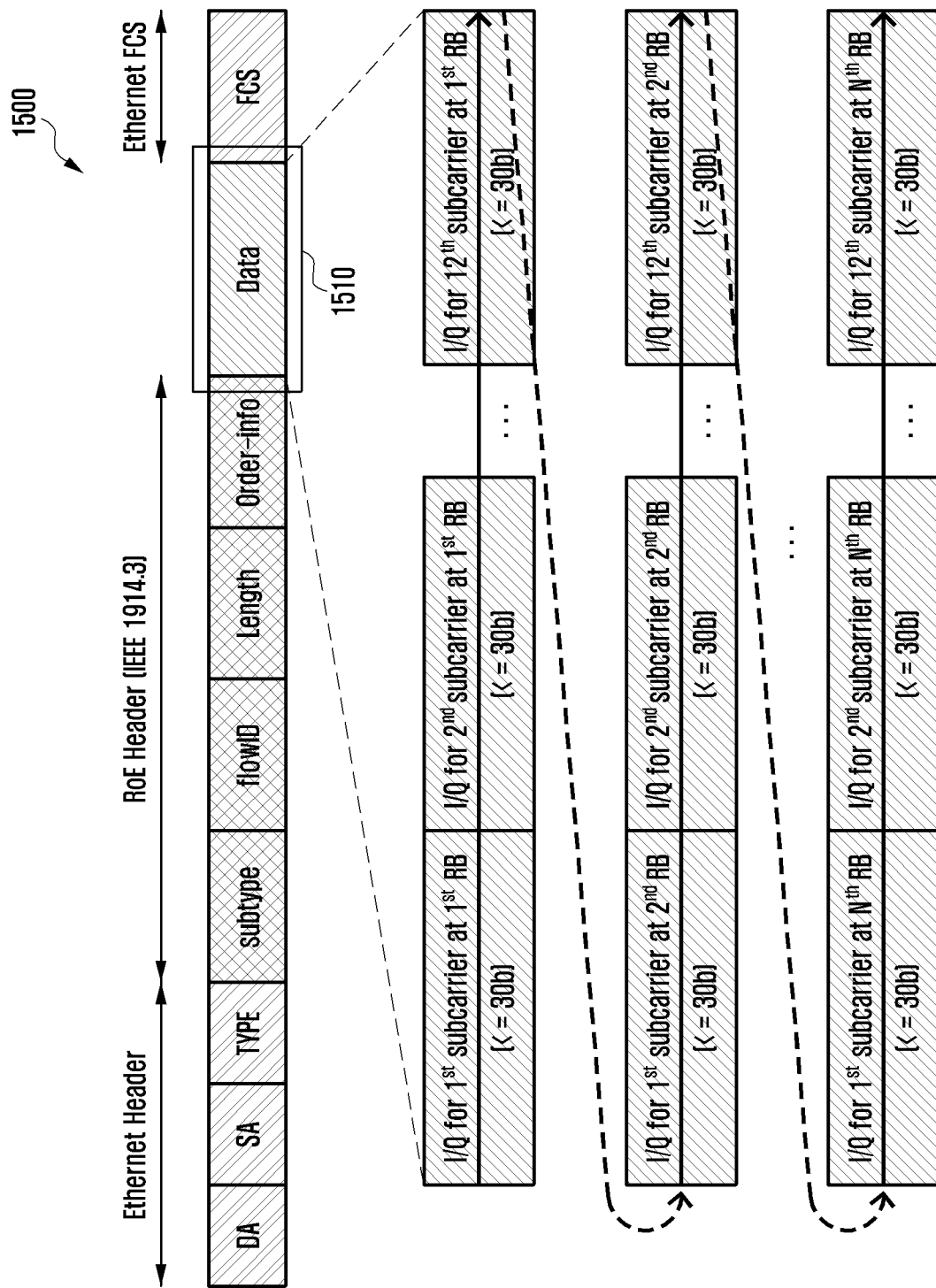
FIG. 15 is a diagram illustrating another message structure according to a disclosed embodiment.

FIG. 15 is a diagram illustrating a detailed format of an SRS message. The SRS message 1500 may be used to convey frequency domain SRS IQ samples in uplink. The data field 1510 of the SRS message 1500 may contain IQ values for the first subcarrier of the first RB to the $12^{th}$ subcarrier of the $N^{th}$ RB, the IQ values being packetized in order; each IQ value may be represented by less than 30 bits. The number of bits for representing an IQ value may be preconfigured between the first and second PHY entities during a cell setup phase.

Figure 16:
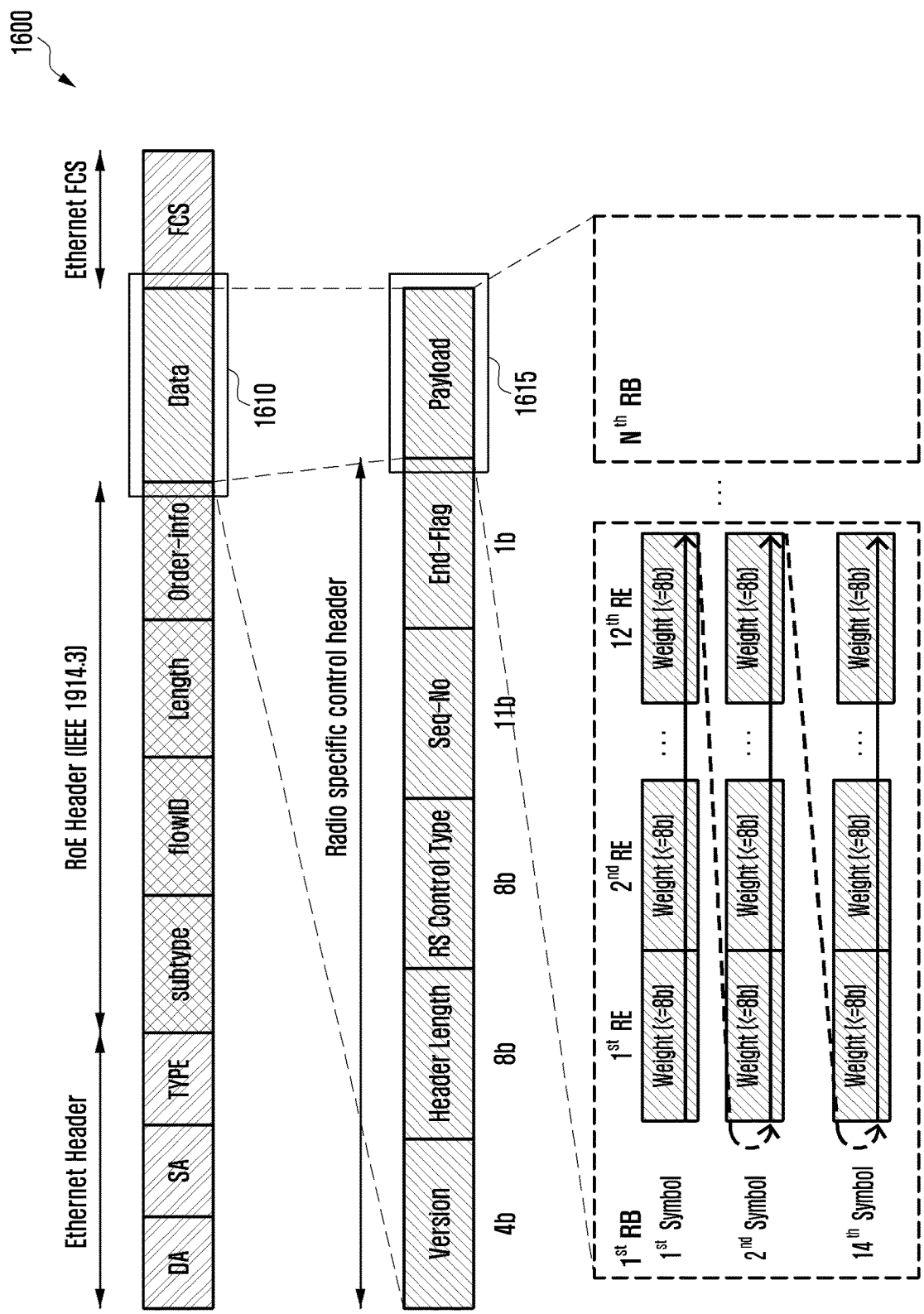
FIG. 16 is a diagram illustrating another message structure according to a disclosed embodiment.

FIG. 16 is a diagram illustrating a detailed format of an RE bitmap message. The RE bitmap message 1600 may include weight indices indicating types of beam weights to be applied to individual REs. The payload 1615 in the data field of the RE bitmap message 1600 may contain weight indices for the first RE of the first symbol of the first RB to the $12^{th}$ RE of the $14^{th}$ symbol of the $N^{th}$ RB, the weight indices being packetized in order; the RB size N may be preconfigured between the first and second PHY entities during a cell setup phase.

Figure 17:
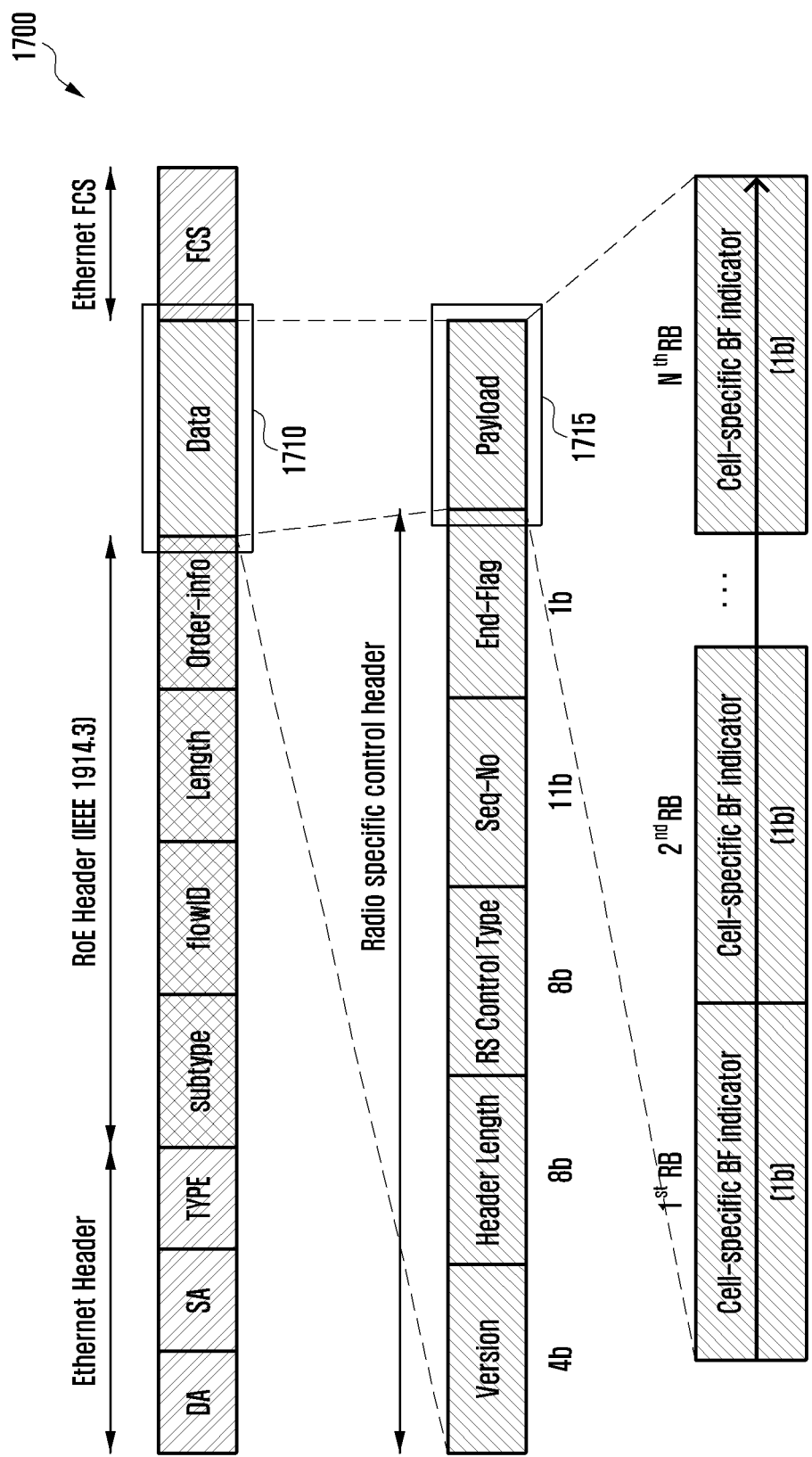
FIG. 17 is a diagram illustrating another message structure according to a disclosed embodiment.

FIG. 17 is a diagram illustrating a detailed format of a PRB bitmap message. The PRB bitmap message 1700 may include information indicating whether each RB is used for cell-specific beamforming or UE-specific beamforming. The payload 1715 in the data field 1710 of the PRB bitmap message 1700 may contain from cell-specific beamforming indicator for the first RB to cell-specific beamforming indicator for the $N^{th}$ RB, the cell-specific beamforming indicators being packetized in order. A cell-specific indicator has a length of 1 bit, which is set to 0b to indicate UE-specific beamforming and 1b to indicate cell-specific beamforming. The RB size N may be preconfigured between the first and second PHY entities during a cell setup phase.

Figure 18:
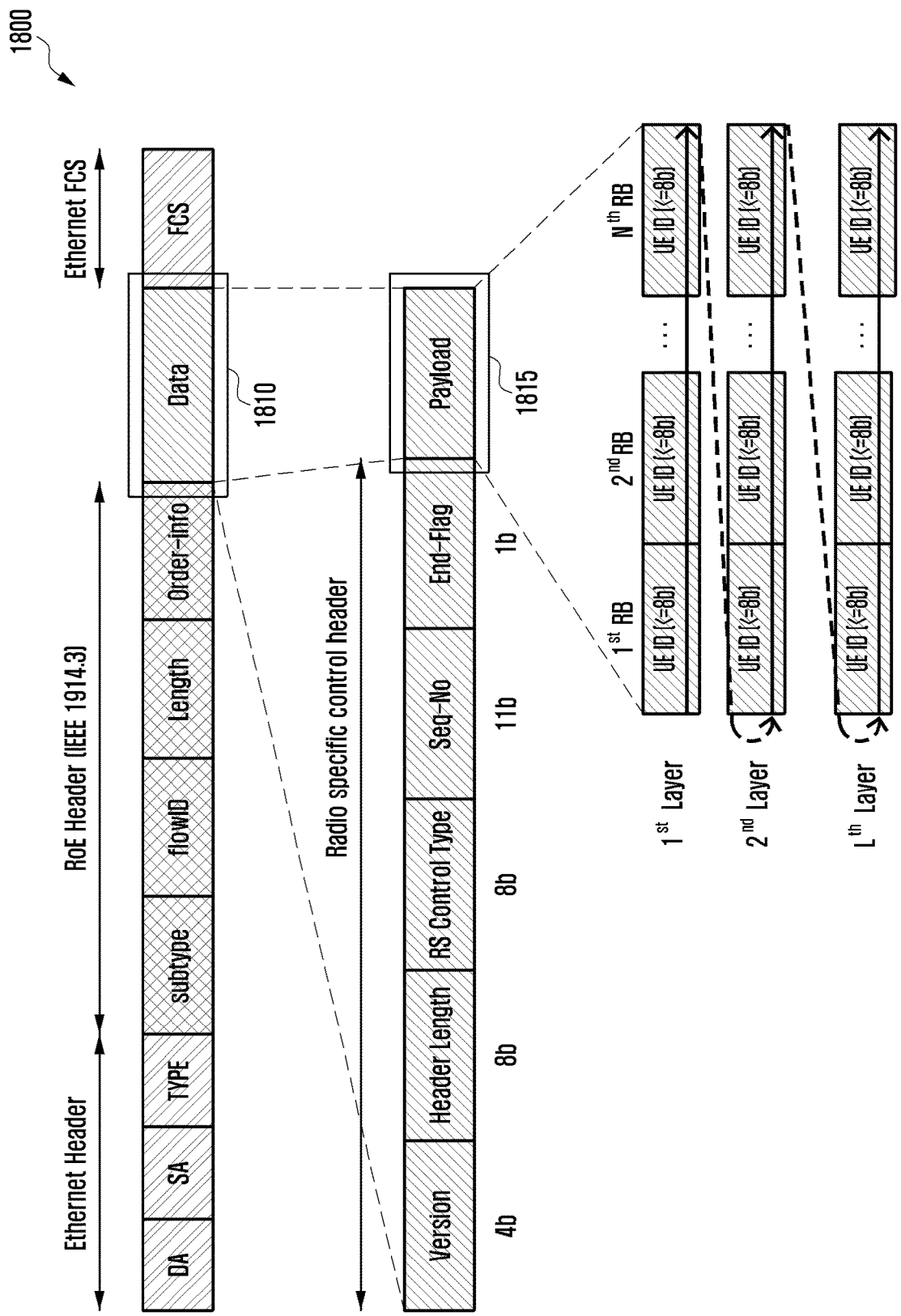
FIG. 18 is a diagram illustrating another message structure according to a disclosed embodiment.

FIG. 18 is a diagram illustrating a detailed format of a scheduling information message. The scheduling information message 1800 may include information indicating a terminal to which each RB is allocated. The payload 1815 in the data field 1810 of the scheduling information message 1800 starts by encapsulating an uplink/downlink indicator that is set to 0 for downlink and 1 for uplink. The uplink/downlink indicator is followed by UE IDs of the terminal to which the first RB is allocated on the first layer to the terminal to which the $N^{th}$ RB is allocated on the $L^{th}$ layer, UE IDs being arranged in order in the payload 1815. The RB size N may be preconfigured between the first and second PHY entities during a cell setup phase.

Figure 19:
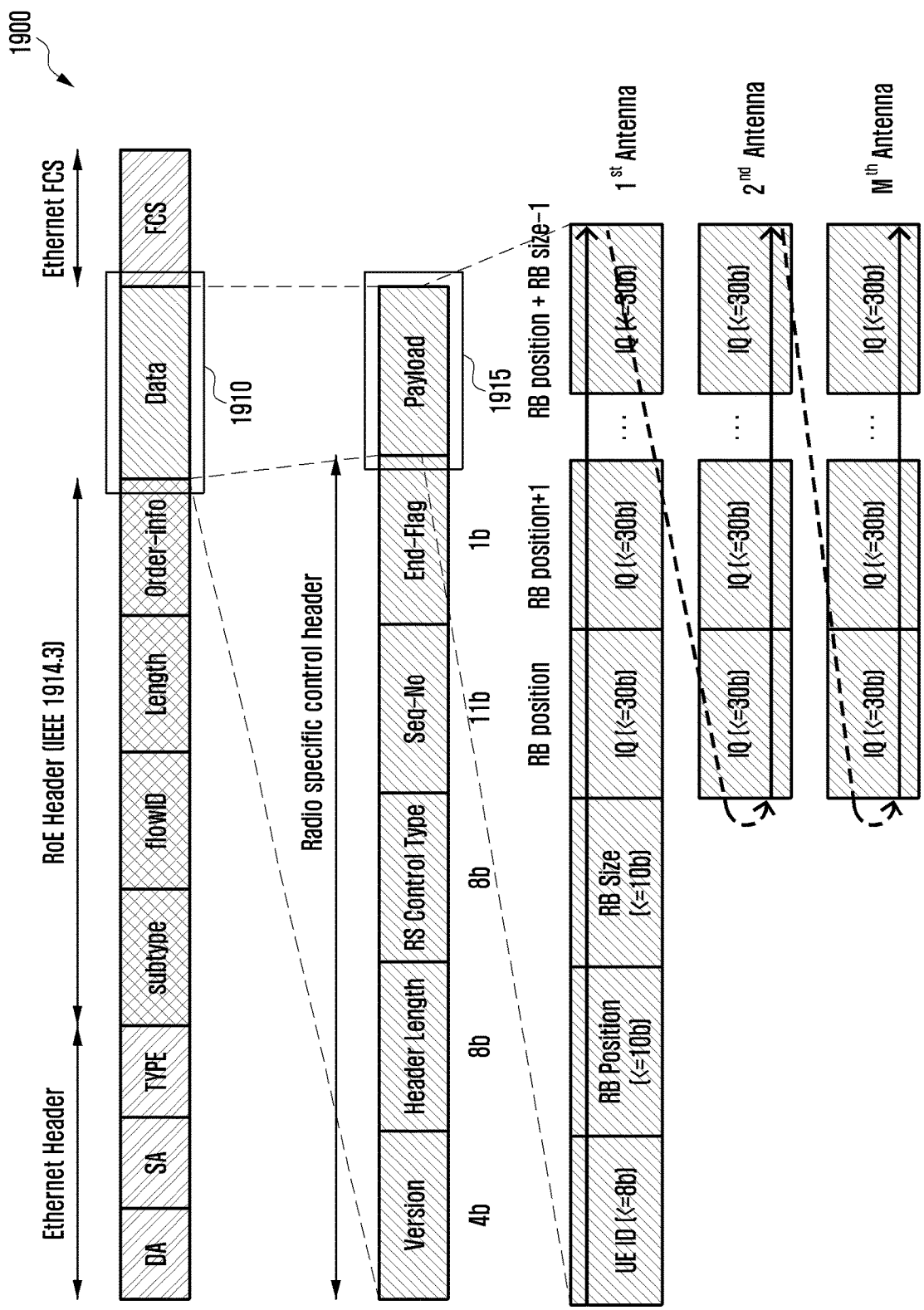
FIG. 19 is a diagram illustrating another message structure according to a disclosed embodiment.

FIG. 19 is a diagram illustrating a detailed format of a UE channel information message. The UE channel information message 1900 may include channel information of a specific terminal. The payload 1915 in the data field 1910 of the UE channel information message 1900 encapsulates a UE ID having a length of 12 bits indicative of a specific terminal, an RB location having a length of 10 bits indicative of an SRS RB location for the specific terminal, and an RB size having a length of 10 bits indicative of an SRS RB size for the specific terminal in order. The UE ID, RB location, and RB size are followed by IQ values for the RB location for the first antenna to the RB size+RB location for the $M^{th}$ antenna, IQ values being arranged in order in the payload 1915. Each IQ value may be represented by less than 30 bits, and the number of bits for representing an IQ value and the number of antennas M may be preconfigured between the first and second PHY entities during a cell setup phase.

Hereinafter, descriptions are made of the procedures for communicating the messages formatted as shown in FIGS. 11 to 19 between the first and second PHY entities.

Figure 20:
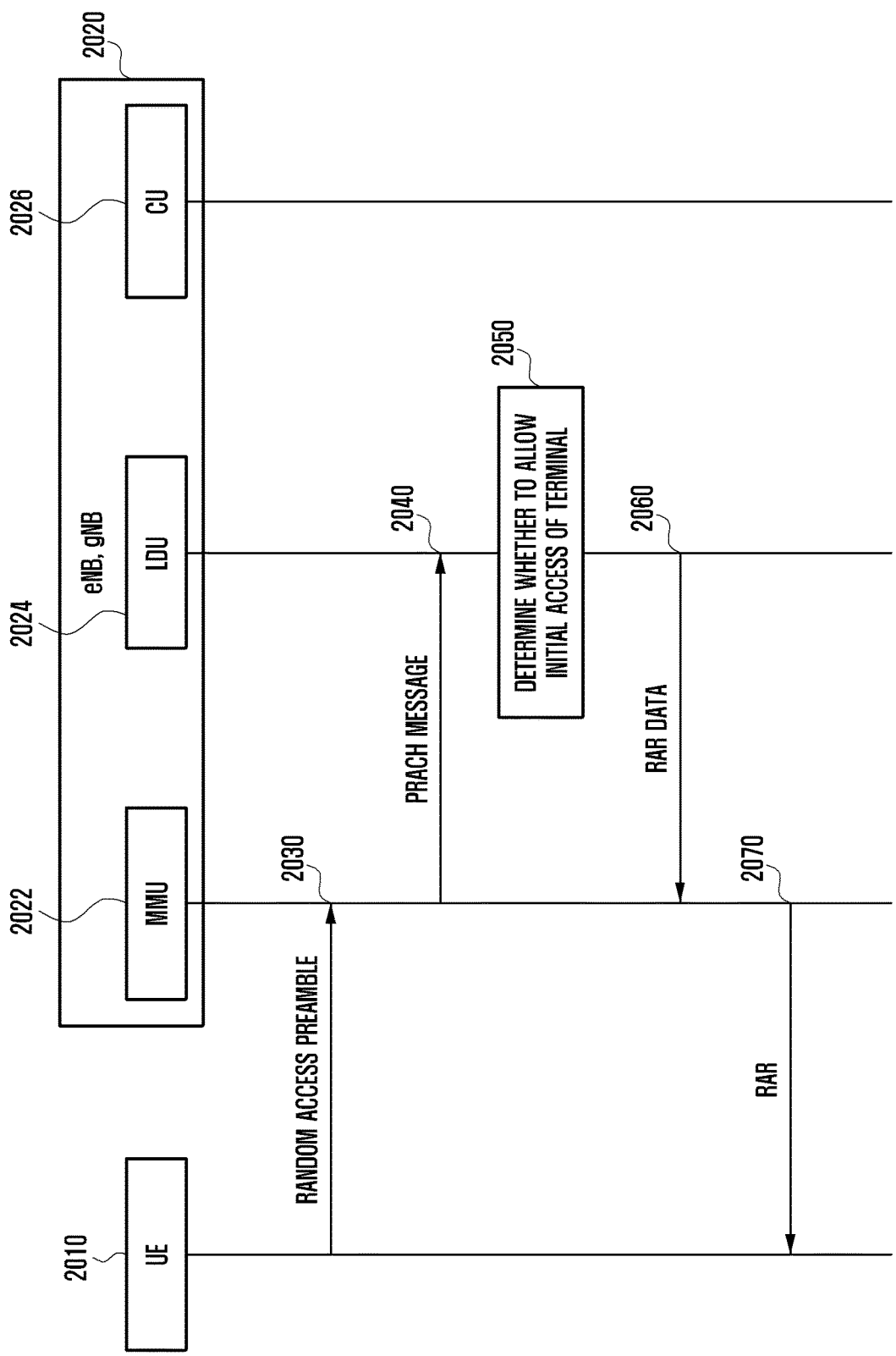
FIG. 20 is a message flow diagram illustrating physical layer message flows according to a disclosed embodiment.

FIG. 20 is a message flow diagram illustrating physical layer message flows in a PRACH transmission procedure according to a disclosed embodiment. FIG. 20 shows message flows between a terminal 2010 and a base station 2020 and among a first PHY entity (i.e., MMU) 2022, a second PHY entity (i.e., LDU) 2024, and a CU 2026 constituting the base station 2020. The CU 2026 may be an entity operating on at least one layer excluding the physical layer in the base station, e.g., an entity operating on at least one of MAC, RLC, PDCP, and RRC layers. In FIG. 20, the first and second entities 2022 and 2024 may each be responsible for at least some of physical layer functions of the base station 2020 and may be established to be responsible for all of the physical layer functions. The first and second PHY entities 2022 and 2024 and the CU 2026 may be connected to each other to be responsible for all layer functions of the base station 2020.

In FIG. 20, the terminal 2010 transmits, at operation 2030, a random access preamble to the base station 2020 for initial access to the base station 2020. The terminal 2010 may transmit the random access preamble to the base station 2020 through a PRACH selected according to a predetermined rule. The first PHY entity 2022 responsible for the RF function of the base station 2020 receives the random access preamble transmitted by the terminal 2010, and the PHY-L processing block 616 described with reference to FIG. 6A performs PRACH filtering on a signal transmitted by the terminal to extract the random access preamble. Next, the first PHY entity 2022 sends a PHRACH message to the second PHY entity 2024 at operation 2040. The PRACH message 2040 transmitted by the first PHY entity 2022 may have the format described with reference to FIG. 14.

The second PHY entity 2024 processes the received PRACH message 2040 to determine whether to allow the initial access of the terminal 2010 at operation 2050 and, if it is determined to allow the initial access of the terminal 2010, sends a random access response (RAR) message 2060 to the first PHY entity 2022 at operation 2060. Next, the first PHY entity 2022 may transmit an RAR to the terminal 2010 at operation 2070.

Figure 21:
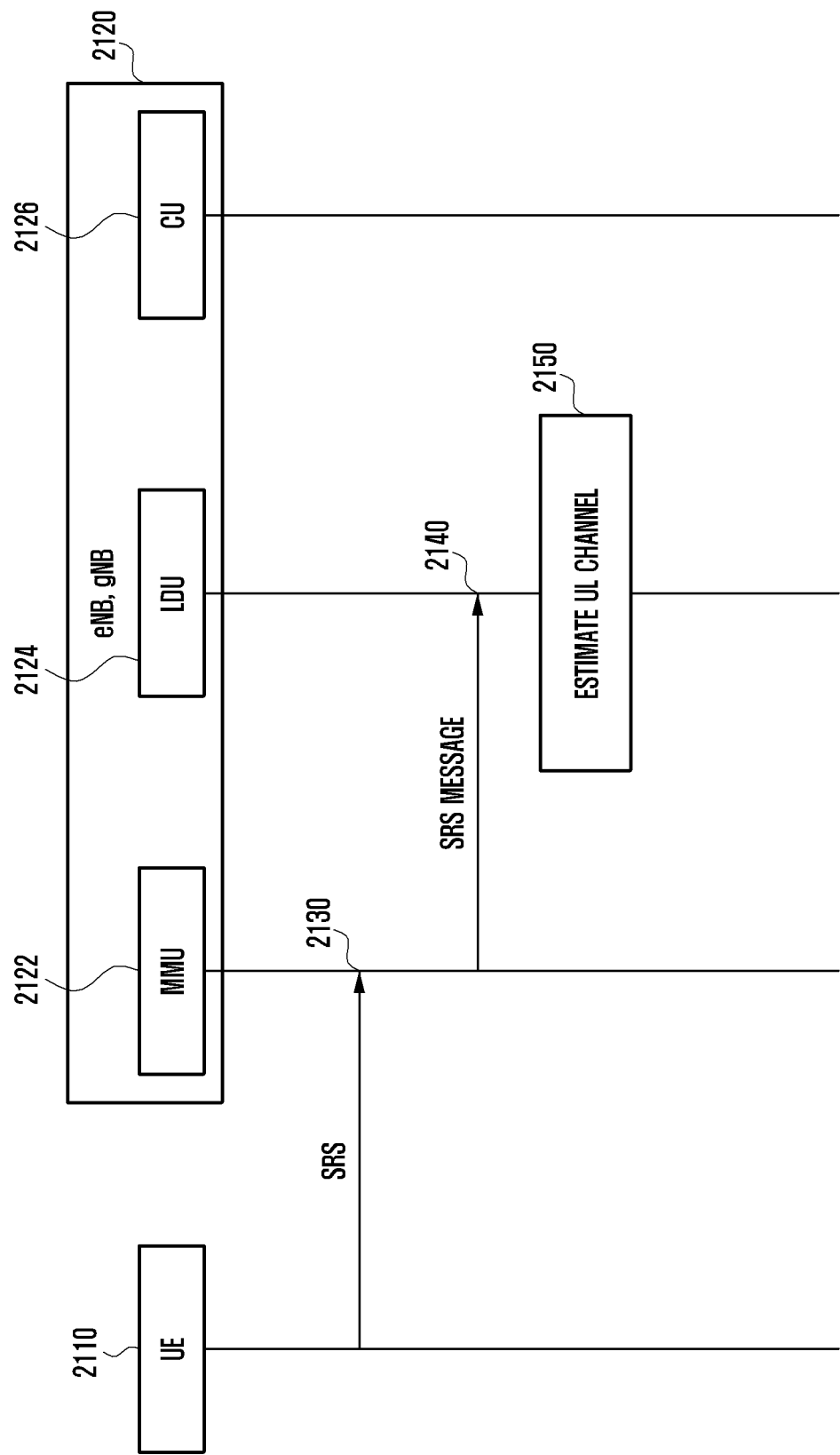
FIG. 21 is a message flow diagram illustrating physical layer message flows according to another disclosed embodiment.

FIG. 21 is a message flow diagram illustrating physical layer message flows in an SRS message transmission procedure according to a disclosed embodiment. FIG. 21 shows message flows between a terminal 2110 and a base station 2120 and among a first PHY entity (i.e., MMU) 2122, a second PHY entity (i.e., LDU) 2124, and a CU 2126 constituting the base station 2120. The CU 2126 may be an entity operating on at least one layer excluding the physical layer in the base station, e.g., an entity operating on at least one of MAC, RLC, PDCP, and RRC layers. In FIG. 21, the first and second entities 2122 and 2124 may each be responsible for at least some of physical layer functions of the base station 2120 and may be established to be responsible for all of the physical layer functions. The first and second PHY entities 2122 and 2124 and the CU 2126 may be connected to each other to be responsible for all layer functions of the base station 2120.

In FIG. 21, the terminal 2110 may transmit an SRS to the base station 2120 at operation 2130 in order for the base station 2120 to estimate an uplink channel. The first PHY entity 2122 receives the SRS transmitted by the terminal 2110 and sends the received SRS to the second PHY entity 2124 because the SRS is processed by the PHY-H processing block 624 of the second PHY entity 2124 as described with reference to FIG. 6B. That is, the first PHY entity 2122 sends the SRS message to the second PHY entity 2124 at operation 2140. The SRS message sent by the first PHY entity may have the format described with reference to FIG. 15.

The second PHY entity 2124 may process the message received at operation 2140 to estimate the uplink channel at operation 2150 by means of the PHY-H processing block 624 of the second PHY entity 2124 as described with reference to FIG. 6B.

Figure 22:
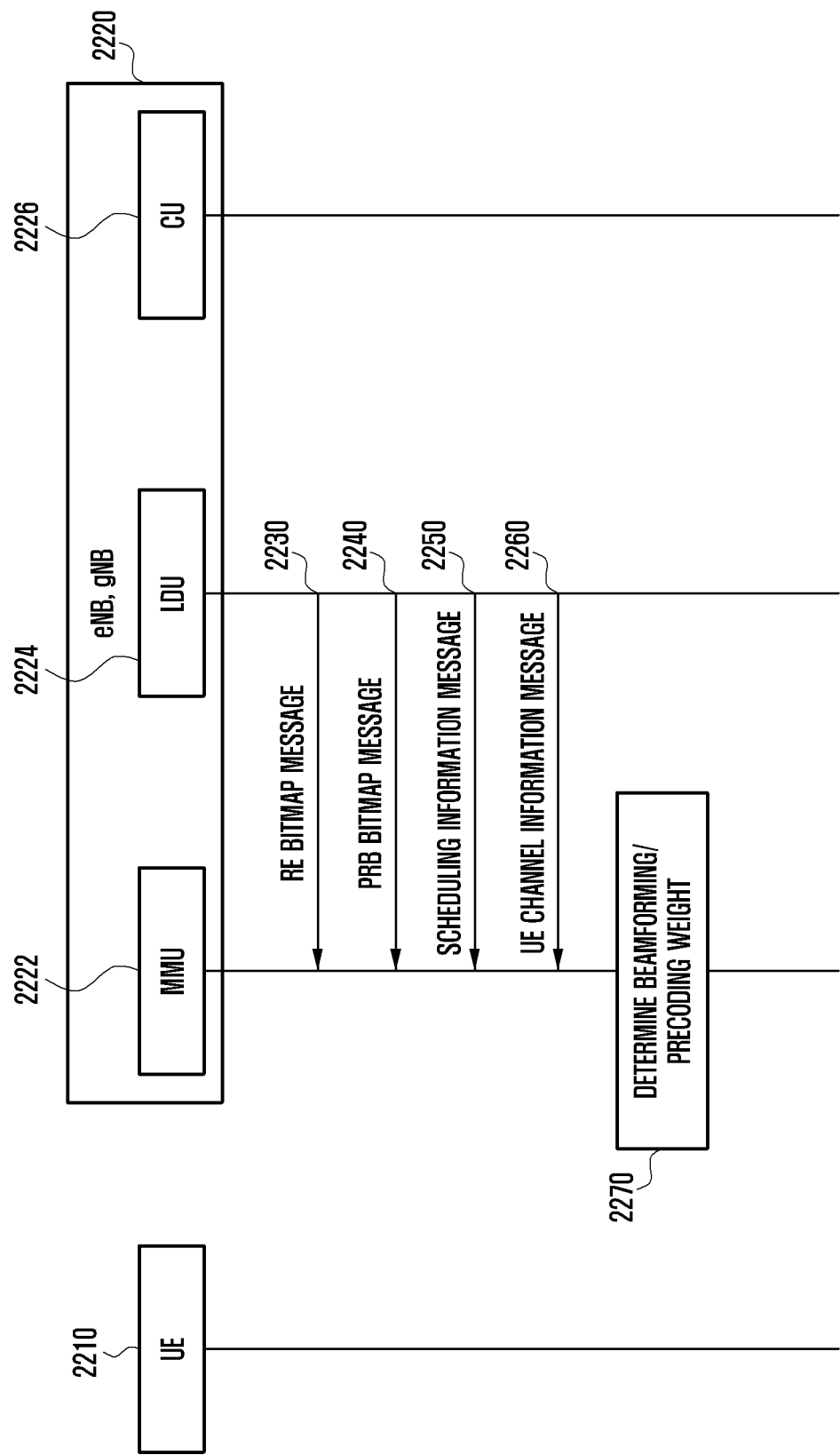
FIG. 22 is a message flow diagram illustrating physical layer message flows according to another disclosed embodiment.

FIG. 22 is a message flow diagram illustrating physical layer message flows for making a beamforming/precoding weight determination by transmitting an RE bitmap message, a PRB bitmap message, a scheduling information message, and a UE channel information message according to a disclosed embodiment. FIG. 22 shows message flows between a terminal 2210 and a base station 2220 and among a first PHY entity (i.e., MMU) 2222, a second PHY entity (i.e., LDU) 2224, and a CU 2226 constituting the base station 2220. The CU 2226 may be an entity operating on at least one layer excluding the physical layer in the base station, e.g., an entity operating on at least one of MAC, RLC, PDCP, and RRC layers. In FIG. 21, the first and second entities 2222 and 2224 may each be responsible for at least some of physical layer functions of the base station 2220 and may be established to be responsible for all of the physical layer functions. The first and second PHY entities 2222 and 2224 and the CU 2226 may be connected to each other to be responsible for all layer functions of the of the base station 2220.

In FIG. 22, the second PHY entity 2224 may send the first PHY entity 2222 an RE bitmap message at operation 2230, a PRB message at operation 2240, a scheduling information message at operation 2250, and a UE channel information message at operation 2260. The second PHY entity 2224 may transmit the above messages to the first PHY entity all together or independently of each other at different time points as shown in FIG. 22. The second PHY entity 2224 may first send two or more messages among the messages shown in FIG. 22 and proceed to send remaining messages in such an exemplary way of sending the RE bitmap message 2230 and the PRB bitmap message 2240 to the first PHY entity 2222 first and proceeding to send the scheduling information message 2250 and the UE channel information message 2260 to the first PHY entity 2222.

Meanwhile, the first PHY entity 2222 may determine, at operation 2270, beamforming/precoding weights for transmitting a signal to the terminal based on at least one of the messages received from the second PHY entity 2224. The first PHY entity 2222 may determine the beamforming/precoding weights based on some of the messages received from the second PHY entity 2224, referencing radio resources to be allocated and a terminal to which the radio resources are allocated that are indicated in the scheduling information message. The first PHY entity 2222 may also take the channel information of the terminal into consideration for determining the beamforming/precoding weights.

In the embodiment of FIG. 22, the RE bitmap message, the PRB bitmap message, the scheduling information message, and the UE channel information message may have the formats that have been respectively described with reference to FIGS. 16 to 19.

Figure 23:
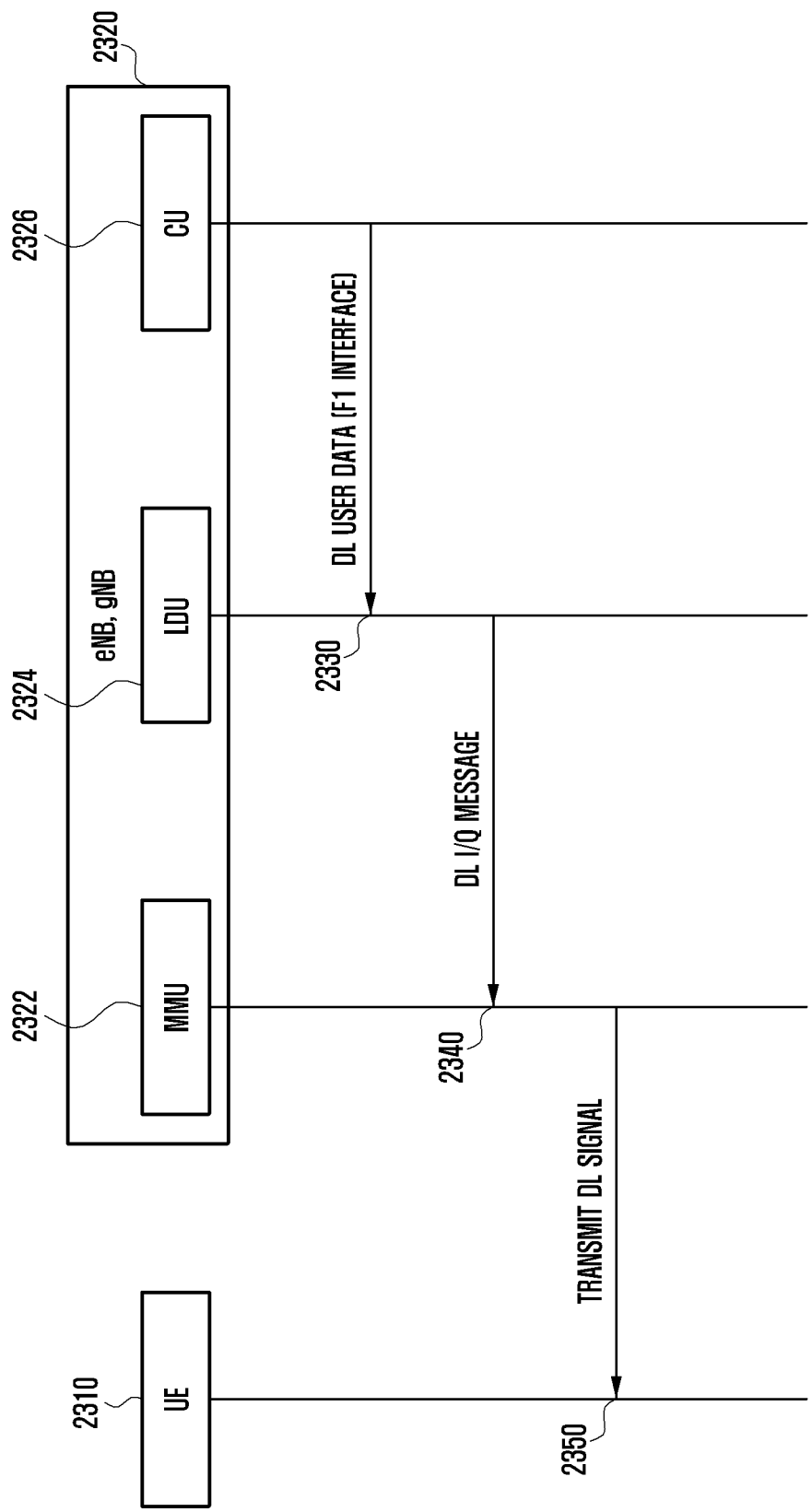
FIG. 23 is a message flow diagram illustrating physical layer message flows according to another disclosed embodiment.

FIG. 23 is a message flow diagram illustrating physical layer message flows in a downlink IQ message transmission procedure according to a disclosed embodiment. FIG. 23 shows message flows between a terminal 2310 and a base station 2320 and among a first PHY entity (i.e., MMU) 2322, a second PHY entity (i.e., LDU) 2324, and a CU 2326 constituting the base station 2320. The CU 2326 may be an entity operating on at least one layer excluding the physical layer in the base station, e.g., an entity operating on at least one of MAC, RLC, PDCP, and RRC layers. In FIG. 23, the first and second entities 2322 and 2324 may each be responsible for at least some of physical layer functions of the base station 2320 and may be established to be responsible for all of the physical layer functions. The first and second PHY entities 2322 and 2324 and the CU 2326 may be connected to each other to be responsible for all layer functions of the of the base station 2320.

In FIG. 23, the CU 2326 may send downlink user data processed by a higher layer to the second PHY entity 2324 at operation 2330 via an interface established between the CU 2326 as an entity responsible for higher layer functions and the second PHY entity 2324. The interface may be referred to as F1 interface, by way of example, or mid-haul interface considering that the interface between the first and second PHY entities has been named fronthaul interface.

The second PHY entity 2324 may convert the received downlink user data to IQ data and send a downlink IQ message including the converted IQ data to the first PHY entity 2322 at operation 2340. The IQ message being sent by the second PHY entity 2324 may have the format described with reference to FIG. 13, and the first PHY entity 2322 generates an RF signal based on the received IQ data and transmits the RF signal to the terminal 2310 in downlink at operation 2350. Here, the first PHY entity 2322 may generate the signal by applying a beamforming/precoding weight determined according to the procedure described with reference to FIG. 22 and transmitting the generated signal.

Figure 24:
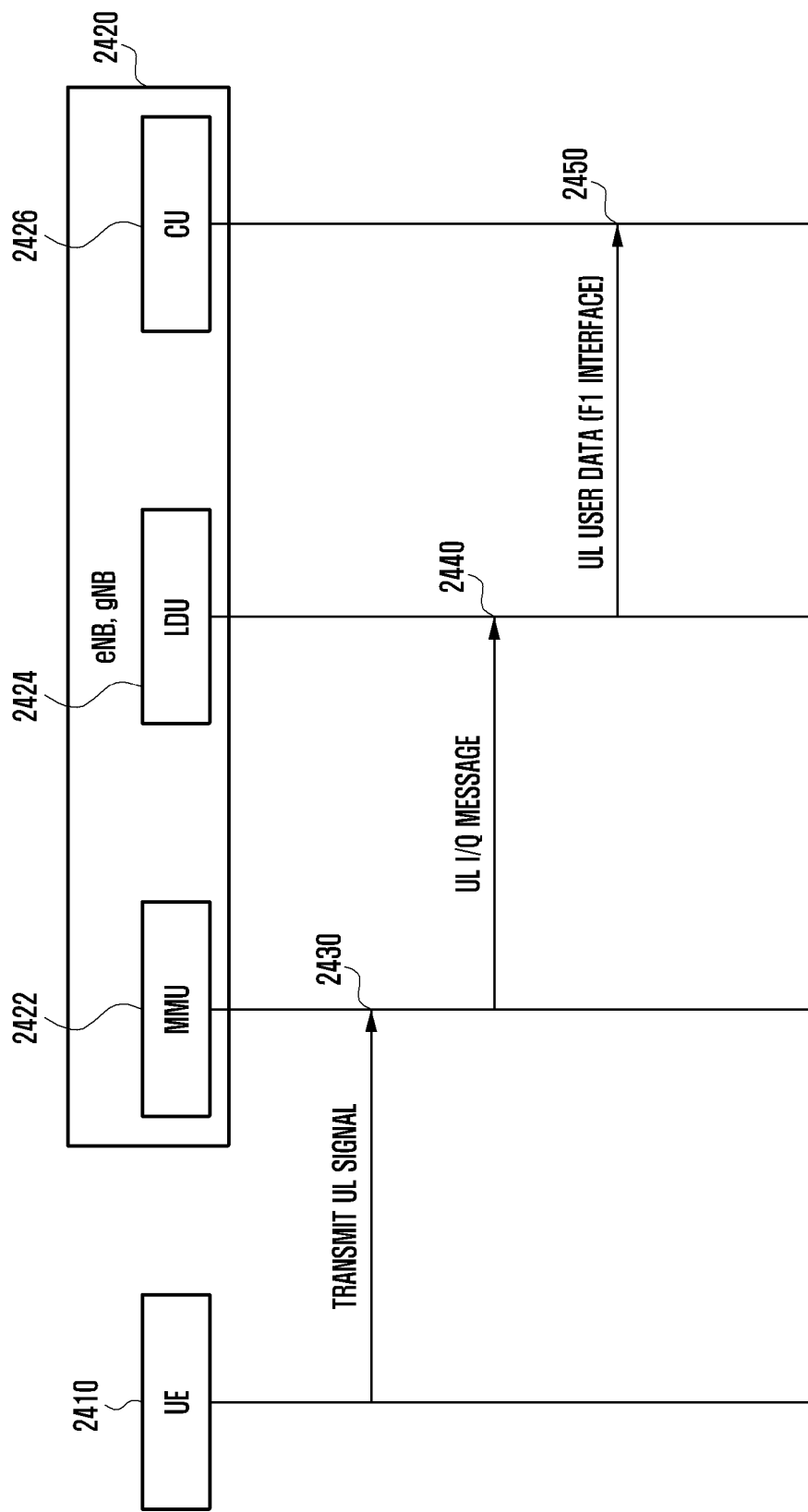
FIG. 24 is a message flow diagram illustrating physical layer message flows according to another disclosed embodiment.

FIG. 24 is a message flow diagram illustrating physical layer message flows in an uplink IQ message transmission procedure according to a disclosed embodiment. FIG. 24 shows message flows between a terminal 2410 and a base station 2420 and among a first PHY entity (i.e., MMU) 2422, a second PHY entity (i.e., LDU) 2424, and a CU 2426 constituting the base station 2420. The CU 2426 may be an entity operating on at least one layer excluding the physical layer in the base station, e.g., an entity operating on at least one of MAC, RLC, PDCP, and RRC layers. In FIG. 24, the first and second entities 2422 and 2424 may each be responsible for at least some of physical layer functions of the base station 2420 and may be established to be responsible for all of the physical layer functions. The first and second PHY entities 2422 and 2424 and the CU 2426 may be connected to each other to be responsible for all layer functions of the base station 2420.

In FIG. 24, the terminal 2420 generates and transmits an uplink signal to the base station 2420 at operation 2430, and the first PHY entity 2422 of the base station 2420 converts the received signal to IQ data and sends the IQ data to the second PHY entity 2424. The first PHY entity 2422 may send the second PHY entity 2424 an uplink IQ message including the IQ data at operation 2440, the uplink IQ message having the format described with reference to FIG. 13. The first PHY entity 2422 may apply a beamforming/precoding weight determined according to the procedure described with reference to FIG. 22 in the procedure of converting the signal received from the terminal 2410 to the IQ data.

The second PHY entity 2424 processes the received IQ data to send uplink user data to the CU 2426 at operation 2450 via an interface established between the CU 2426 as an entity responsible for higher layer functions and the second PHY entity 2424. This interface may be referred to as F1 interface, by way of example, or mid-haul interface considering that the interface between the first and second PHY entities has been named fronthaul interface.

Although the exemplary embodiments disclosed in the specification and drawings have been described using specific terms, the specification and drawings are to be regarded in an illustrative rather than a restrictive sense in order to help understand the disclosure. It is obvious to those skilled in the art that various modifications and changes can be made thereto without departing from the broader spirit and scope of the disclosure.

What is claimed is:

1. A method performed by a first entity performing high physical layer functions of a base station in a wireless communication system, the method comprising:
   identifying a fronthaul interface between the first entity and a second entity performing low physical layer functions of the base station; and
   exchanging a control plane message or a user plane message with the second entity via the fronthaul interface,
   wherein the low physical layer functions include a digital beamforming and a precoding for a downlink and a digital beamforming for an uplink,
   wherein the high physical layer functions include a modulation and a resource element (RE) mapping for the downlink and a demodulation and a RE demapping for the uplink, and
   wherein, for the uplink, the fronthaul interface is provided between a function of the RE demapping in the first entity and the function of the digital beamforming for the uplink in the second entity.

2. The method of claim 1, wherein the low physical layer functions further include a physical random access channel (PRACH) filtering for the uplink.

3. The method of claim 2, wherein the low physical layer functions further include:
   an inverse Fast Fourier Transform (iFFT) and a cyclic prefix (CP) addition for the downlink, and
   an FFT, and a CP removal for the uplink.

4. The method of claim 1, wherein in case of the downlink, the fronthaul interface is provided between a function of the RE mapping in the first entity and a function of the digital beamforming in the second entity.

5. The method of claim 1,
   wherein the exchanging of the control plane message or the user plane message comprises:
      transmitting, to the second entity via the fronthaul interface, the control plane message including scheduling information for the uplink and the downlink and information on the digital beamforming, and
   wherein the control plane message and the user plane message are identified based on a subtype field of radio over ethernet (ROE).

6. A method performed by a second entity performing low physical layer functions of a base station in a wireless communication system, the method comprising:
- identifying a fronthaul interface between a first entity performing high physical layer functions of the base station and the second entity; and
- exchanging a control plane message or a user plane message with the first entity via the fronthaul interface,
- wherein the low physical layer functions include a digital beamforming and a precoding for a downlink and a digital beamforming for an uplink,
- wherein the high physical layer functions include a modulation and a resource element (RE) mapping for the downlink and a demodulation and a RE demapping for the uplink, and
- wherein, for the uplink, the fronthaul interface is provided between a function of the RE demapping in the first entity and the function of the digital beamforming for the uplink in the second entity.

7. The method of claim 6, wherein the low physical layer functions further include a physical random access channel (PRACH) filtering for the uplink.

8. The method of claim 7, wherein the low physical layer functions further include:
- an inverse Fast Fourier Transform (iFFT) and a cyclic prefix (CP) addition for the downlink, and
- an FFT, and a CP removal for the uplink.

9. The method of claim 6, wherein in case of the downlink, the fronthaul interface is provided between a function of the RE mapping in the first entity and a function of the digital beamforming in the second entity.

10. The method of claim 6,
- wherein the exchanging of the control plane message or the user plane message comprises:
  - receiving, from the first entity via the fronthaul interface, the control plane message including scheduling information for the uplink and the downlink and information on the digital beamforming, and
- wherein the control plane message and the user plane message are identified based on a subtype field of radio over ethernet (ROE).

11. A first entity performing high physical layer functions of a base station in a wireless communication system, the first entity comprising:
- a transceiver configured to transmit and receive a signal; and
- at least one processor coupled with the transceiver and configured to:
  - identify a fronthaul interface between the first entity and a second entity performing low physical layer functions of the base station, and
  - exchange a control plane message or a user plane message with the second entity via the fronthaul interface,
- wherein the low physical layer functions include a digital beamforming and a precoding for a downlink and a digital beamforming for an uplink,
- wherein the high physical layer functions include a modulation and a resource element (RE) mapping for the downlink and a demodulation and a RE demapping for the uplink, and
- wherein, for the uplink, the fronthaul interface is provided between a function of the RE demapping in the first entity and the function of the digital beamforming for the uplink in the second entity.

12. The first entity of claim 11, wherein the low physical layer functions further include a physical random access channel (PRACH) filtering for the uplink.

13. The first entity of claim 12, wherein the low physical layer functions further include:
- an inverse Fast Fourier Transform (iFFT) and a cyclic prefix (CP) addition for the downlink, and
- an FFT, and a CP removal for the uplink.

14. The first entity of claim 11, wherein in case of the downlink, the fronthaul interface is provided between a function of the RE mapping in the first entity and a function of the digital beamforming in the second entity.

15. The first entity of claim 11,
- wherein the at least one processor is configured to transmit, to the second entity via the fronthaul interface, the control plane message including scheduling information for the uplink and the downlink and information on the digital beamforming, and
- wherein the control plane message and the user plane message are identified based on a subtype field of radio over ethernet (ROE).

16. A second entity performing low physical layer functions of a base station in a wireless communication system, the second entity comprising:
- a transceiver configured to transmit and receive a signal; and
- at least one processor coupled with the transceiver and configured to:
  - identify a fronthaul interface between a first entity performing high physical layer functions of the base station and the second entity, and
  - exchange a control plane message or a user plane message with the first entity via the fronthaul interface,
- wherein the low physical layer functions include a digital beamforming and a precoding for a downlink and a digital beamforming for an uplink,
- wherein the high physical layer functions include a modulation and a resource element (RE) mapping for the downlink and a demodulation and a RE demapping for the uplink, and
- wherein, for the uplink, the fronthaul interface is provided between a function of the RE demapping in the first entity and the function of the digital beamforming for the uplink in the second entity.

17. The second entity of claim 16, wherein the low physical layer functions further include a physical random access channel (PRACH) filtering for the uplink.

18. The second entity of claim 17, wherein the low physical layer functions further include:
- an inverse Fast Fourier Transform (iFFT) and a cyclic prefix (CP) addition for the downlink, and
- an FFT, and a CP removal for the uplink.

19. The second entity of claim 16, wherein in case of the downlink, the fronthaul interface is provided between a function of the RE mapping in the first entity and a function of the digital beamforming in the second entity.

20. The second entity of claim 16,
- wherein the at least one processor is configured to receive, from the first entity via the fronthaul interface, the control plane message including scheduling information for the uplink and the downlink and information on the digital beamforming, and
- wherein the control plane message and the user plane message are identified based on a subtype field of radio over ethernet (ROE).

* * * * *